(12) United States Patent
Kosgi et al.

(10) Patent No.: US 12,197,313 B1
(45) Date of Patent: Jan. 14, 2025

(54) APPARATUS AND METHODS FOR GENERATING A TECHNICAL DEBT MANAGEMENT AND DATA MANAGEMENT MACHINE

(71) Applicant: NetImpact Strategies, Inc., Falls Church, VA (US)

(72) Inventors: Praveen Kosgi, Aldie, VA (US); Venkatapathi R. Puvvada, Reston, VA (US)

(73) Assignee: NETIMPACT STRATEGIES, INC., Falls Church, VA (US)

( * ) Notice: Subject to any disclaimer, the term of this patent is extended or adjusted under 35 U.S.C. 154(b) by 0 days.

(21) Appl. No.: 18/757,455

(22) Filed: Jun. 27, 2024

(51) Int. Cl.
G06F 9/44 (2018.01)
G06F 11/36 (2006.01)

(52) U.S. Cl.
CPC ................. *G06F 11/3676* (2013.01)

(58) Field of Classification Search
None
See application file for complete search history.

(56) References Cited

U.S. PATENT DOCUMENTS

| | | | | |
|---|---|---|---|---|
| 8,943,464 | B2 * | 1/2015 | Duesterwald | G06Q 10/06 717/102 |
| 11,307,846 | B2 * | 4/2022 | Trahan | G06F 8/658 |
| 11,971,804 | B1 * | 4/2024 | Pandurangarao | G06F 11/3608 |
| 2014/0040871 | A1 * | 2/2014 | Schwan | G06F 11/3664 717/141 |
| 2014/0289697 | A1 * | 9/2014 | Wenda | G06Q 10/06 717/102 |

OTHER PUBLICATIONS

Blumberg et al., "Demystifying digital dark matter: A new standard to tame technical debt", McKinsey & Company, Jun. 23, 2022, 6 pages, https://www.mckinsey.com/capabilities/mckinsey-digital/our-insights/demystifying-digital-dark-matter-a-new-standard-to-tame-technical-debt.

Cairns et al., "What is technical debt?", 18F, Sep. 4, 2015, https://18f.gsa.gov/2015/09/04/what-is-technical-debt/.

Gierszal, Olga, "15 Common Technical Debt Examples with Solving Guidance and Tips on How to Avoid", Brainhub, 2024, https://brainhub.eu/library/technical-debt-examples.

* cited by examiner

*Primary Examiner* — Qamrun Nahar
(74) *Attorney, Agent, or Firm* — FisherBroyles, LLP; James J. Pohl

(57) ABSTRACT

Provided are methods and apparatus for generating at least a portion of a technical debt management machine. In an example, a computer-implemented method includes (i) comparing, by at least one processor and by automatically searching using a rule engine, information in at least a portion of an object in a software platform to a rule to identify a violation of the rule, where (a) the rule describes at least one information characteristic whose presence in an object being scanned indicates technical debt and results in the violation of the rule; and (b) the rule describes an amount that a technical debt score must be changed for the violation; (ii) changing, responsive to the violation, the technical debt score by the amount the technical debt score must be changed for the violation; and (iii) displaying, by a user display device and via a user interface, the technical debt score.

21 Claims, 23 Drawing Sheets

TDG Workspace – Step 2: Enter Rule Details – Add Filter Conditions

FIG. 4E

TDG Workspace - Step 3: Activate Rules

FIG. 4F

TDG Workspace - Home Page

FIG. 6

| TD Type | Weight | Score | Applicable Objects | Tech Debt Objects | Remedition Effort/Object | Estimated Debt in | | | | Budget | | | | |
|---|---|---|---|---|---|---|---|---|---|---|---|---|---|---|
| | | | | | | Critical | High | Med | Low | Effort | 100% Critical | 80% High | 50% Med | Optional Low | Total |
| Architecture | 10.00 | 5.00 | 150.00 | 75.00 | 50.00 | 938 | 1875 | 375 | 563 | 3750 | 938 | 1500 | 188 | 750 | 3375 |
| Build Debt | 5.00 | 2.50 | 100.00 | 50.00 | 40.00 | 500 | 1000 | 200 | 300 | 2000 | 500 | 800 | 100 | 300 | 1700 |
| Code | 15.00 | 7.50 | 100.00 | 50.00 | 40.00 | 500 | 1000 | 200 | 300 | 2000 | 500 | 800 | 100 | 300 | 1700 |
| Defect Debt | 5.00 | 3.00 | 1000.00 | 600.00 | 8.00 | 1200 | 2400 | 480 | 720 | 4800 | 1200 | 1920 | 240 | 720 | 4080 |
| Design | 15.00 | 7.00 | 1500.00 | 700.00 | 80.00 | 14000 | 28000 | 5600 | 8400 | 56000 | 14000 | 22400 | 2800 | | 39200 |
| Documentation | 5.00 | 1.25 | 100.00 | 25.00 | 40.00 | 250 | 500 | 100 | 150 | 1000 | 250 | 400 | 50 | 150 | 850 |
| Infrastructure | 5.00 | 1.00 | 25.00 | 5.00 | 40.00 | 50 | 100 | 20 | 30 | 200 | 50 | 80 | 10 | 30 | 170 |
| People | 5.00 | 2.50 | 100.00 | 50.00 | 80.00 | 1000 | 2000 | 400 | 600 | 4000 | 1000 | 1600 | 200 | 600 | 3400 |
| Process | 5.00 | 1.00 | 250.00 | 50.00 | 16.00 | 200 | 400 | 80 | 120 | 800 | 200 | 320 | 40 | 120 | 680 |
| Requirements | 5.00 | 2.50 | 1000.00 | 500.00 | 4.00 | 500 | 1000 | 200 | 300 | 2000 | 500 | 800 | 100 | 300 | 1700 |
| Security Debt | 10.00 | 1.67 | 1500.00 | 250.00 | 16.00 | 1000 | 2000 | 400 | 600 | 4000 | 1000 | 1600 | 200 | 600 | 3400 |
| Service/Data Debt | 5.00 | 1.00 | 2500.00 | 500.00 | 16.00 | 2000 | 4000 | 800 | 1200 | 8000 | 2000 | 3200 | 400 | | 5600 |
| Test Automation | 5.00 | 1.67 | 150.00 | 50.00 | 40.00 | 500 | 1000 | 200 | 300 | 2000 | 500 | 800 | 100 | 300 | 1700 |
| Test Debt | 5.00 | 0.67 | 150.00 | 20.00 | 8.00 | 40 | 80 | 16 | 24 | 160 | 40 | 64 | 8 | | 112 |
| Sum of All | 100 | 38 | 8,625 | 2,925 | 478 | 22,678 | 45,355 | 9,071 | 13,607 | 90,710 | 22,678 | 32,284 | 4,536 | | 67,667 |
| | | | 34% | | | | | | | | | | | | |

Enterprise                               Must Reduce at 75%                    68,032.50

Application                       Impact Level based allocation of budget        75%

FIG. 7

| Enterprise Spread | | | | | | |
|---|---|---|---|---|---|---|
| TD Type | Spread | Applicable Objects | Tech Debt Critical | High | Moderate | Low |
| Architecture | 34% | 1500 | 750 | 50 | 20 | 100 | 400 |
| Build Debt | 8% | 100 | 50 | 50 | 20 | 100 | 400 |
| Code | 10% | 100 | 50 | 50 | 20 | 100 | 400 |
| Defect Debt | 5% | 100 | 60 | 50 | 20 | 100 | 400 |
| Design | 5% | 150 | 70 | 50 | 20 | 100 | 400 |
| Documentation | 5% | 100 | 25 | 50 | 20 | 100 | 400 |
| Infrastructure | 5% | 1200 | 800 | 50 | 20 | 100 | 400 |
| People | 5% | 100 | 50 | 50 | 20 | 100 | 400 |
| Process | 5% | 250 | 50 | 50 | 20 | 100 | 400 |
| Requirements | 5% | 100 | 50 | 50 | 20 | 100 | 400 |
| Security Debt | 2% | 150 | 25 | 50 | 20 | 100 | 400 |
| Service/Data Debt | 5% | 250 | 50 | 50 | 20 | 100 | 400 |
| Test Debt | 5% | 150 | 50 | 50 | 20 | 100 | 400 |
| Automation Test | 1% | 150 | 20 | 50 | 20 | 100 | 400 |

FIG. 9

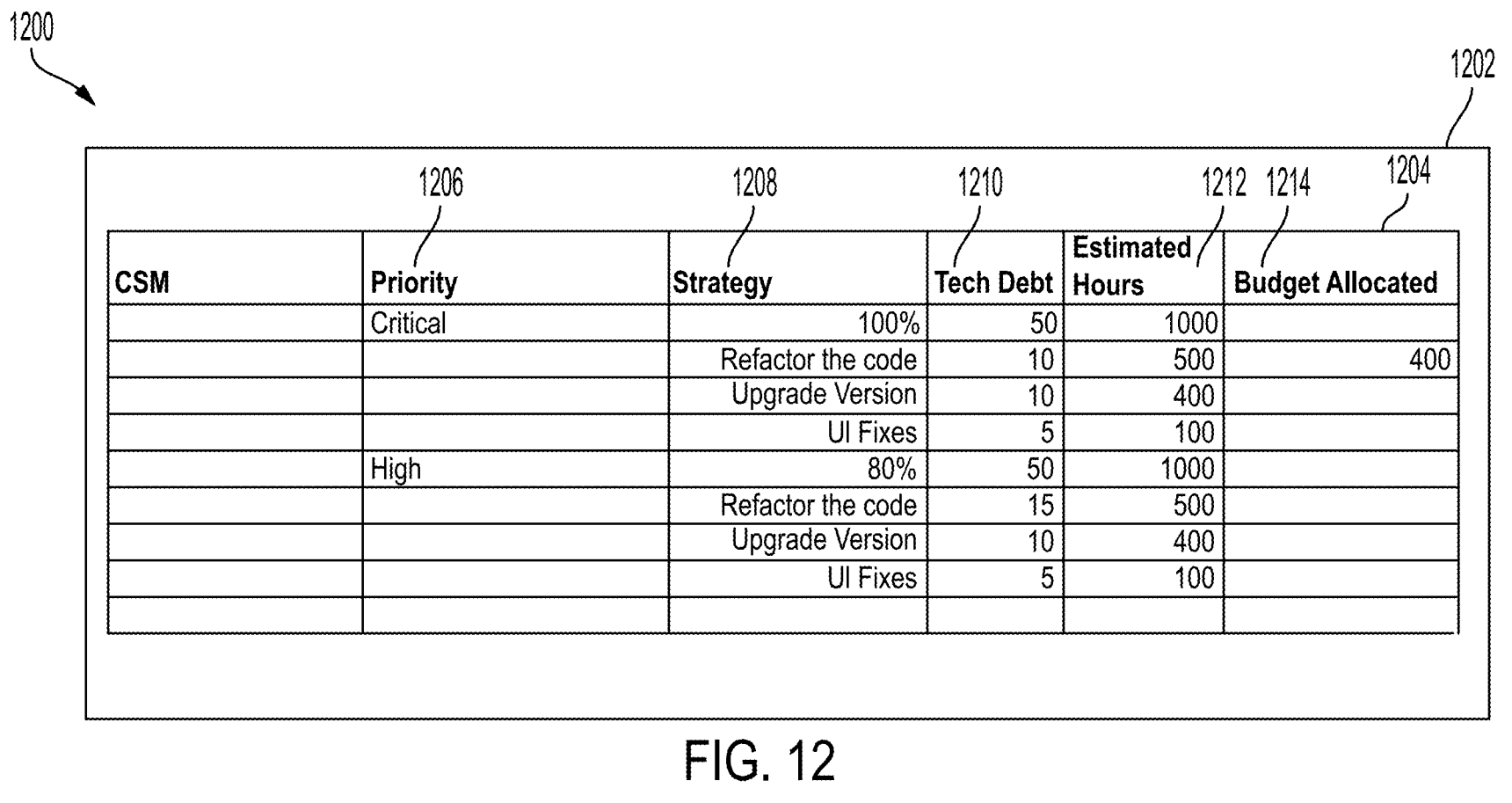

| CSM | Priority | Strategy | Tech Debt | Estimated Hours | Budget Allocated |
|---|---|---|---|---|---|
| | Critical | 100% | | | |
| | | Refactor the code | 50 | 1000 | 400 |
| | | Upgrade Version | 10 | 500 | |
| | | UI Fixes | 10 | 400 | |
| | High | 80% | 5 | 100 | |
| | | Refactor the code | 50 | 1000 | |
| | | Upgrade Version | 15 | 500 | |
| | | UI Fixes | 10 | 400 | |
| | | | 5 | 100 | |

FIG. 12

| Title | Description | Discovery Approach | Resolution Approach |
|---|---|---|---|
| Do not allow ACLs with no role | Ensure all ACLs have at least one role | For each sys_security_acl there is at least one sys_security_access_role | Refactor Actions |
| Logging level properties configured | | Scan sys_properties | Reconfigure Actions |
| Don't use a variable called gr in scripts | Using the 'gr' variable name convention used in | Regex pattern against all script-type fields | Refactor Actions |
| List Report without any columns selected | List Report without any columns selected | Function to query table and get count of matching records | Refactor Actions |
| Having many Cross Privileges in a custom application, might be an indication that during development these Cross Scope privileges were added unintentionally. | Having many Cross Privileges in a custom application, might be an indication that during development these Cross Scope privileges were added unintentionally. | Table query & count | Refactor Actions |
| gr.get() should always be wrapped in a conditional statement | | Scan server-side script fields | Refactor Actions |

FIG. 15B

| Title | Source | TD Map | Active |
|---|---|---|---|
| Do not allow ACLs with no role | File inspection | Do not allow ACLs with no role | TRUE |
| Logging level properties configured | Sytem Properties | Logging level properties configured | TRUE |
| Don't use a variable called gr in scripts | Script | Don't use a variable called gr in scripts | TRUE |
| List Report without any columns selected | Misconfiguration | List Report without any columns selected | TRUE |
| Having many Cross Privileges in a custom application, might be an indication that during development these Cross Scope privileges were added unintentionally. | Architecture | Having many Cross Privileges in a custom application, might be an indication that during development these Cross Scope privileges were added unintentionally. | TRUE |
| gr.get() should always be wrapped in a conditional statement | Script | gr.get() should always be wrapped in a conditional statement | TRUE |

FIG. 15C

APPARATUS AND METHODS FOR GENERATING A TECHNICAL DEBT MANAGEMENT AND DATA MANAGEMENT MACHINE

FIELD OF DISCLOSURE

This disclosure relates generally to the technical fields of electronics, computer-readable media, computer engineering, and more specifically, but not exclusively, to apparatus and methods for generating at least a portion of a technical debt management machine, at least a portion of a data management machine, or both.

BACKGROUND

There is presently market demand for computer-implemented technical debt management tools.

Technical debt is a term describing defects of tangible device resulting in an increased cost of changing a tangible device, maintaining the tangible device, or both, due to producing the tangible device in a manner that increases product defects of the tangible device because production tasks were initially performed sub-optimally. A quantity of technical debt of a product can increase when production cost reductions are prioritized over providing a high level of product quality, production speed increases are prioritized over providing a high level of product quality, or both.

For example, technical debt is created when a software development team chooses a short-term sub-optimal action to complete a production task (e.g. taking a shortcut). The sub-optimal action can subsequently lead to requirements to repair problems associated with taking the sub-optimal action. As another example, a form of technical debt known as "test debt" is created when the software development team is required to perform certain tests on their software prior to releasing the software for customer use, but the software development team instead chooses to not perform the tests, thus increasing a risk of releasing a faulty product whose faults would otherwise be identified by the omitted testing and increasing a subsequent cost of identifying and repairing the faults.

The effects of creating technical debt are numerous and include malfunctioning computing devices, computing devices that perform sub-optimally, computing devices that perform unpredictably, computing devices that do not provide adequate security, computing devices that require frequent updates (i.e. patches), product release delays, and increased product repair costs. Technical debt is also dangerous because, in many circumstances, manufacturers do not know how much technical debt the manufacturer has, where the technical debt is present in their products, or both.

Accordingly, there are previously unaddressed and long-felt industry needs for methods and apparatus that improve upon conventional methods and conventional apparatus.

SUMMARY

As is described in greater detail herein, the instant disclosure describes various systems and methods for generating at least a portion of a technical debt management machine, at least a portion of a data management machine, or both. In examples, the machine can include at least a portion of a technical debt management system configured as a set of computer-executable instructions (e.g. software instructions), where the computer-executable instructions can be stored on a suitable non-transitory computer-readable data storage element, a suitable non-transitory computer-readable medium, or both. The provided systems and methods address the previously unaddressed and long-felt industry needs for methods and apparatus that improve upon the conventional methods and the conventional apparatus.

In an example, provided is a computer-implemented method for automatically generating at least a portion of a technical debt management machine. The method can be performed by a computing device comprising at least one processor. In examples, the method can include: (i) comparing, by the at least one processor and by automatically searching using a rule engine, information in at least a portion of an object in a software platform to a rule to identify a violation of the rule, where (a) the rule describes at least one information characteristic whose presence in an object being scanned indicates technical debt and results in the violation of the rule and (b) the rule describes an amount that a technical debt score must be changed for the violation of the rule; (ii) changing, responsive to the violation of the rule, the technical debt score by the amount the technical debt score must be changed for the violation of the rule; and (iii) displaying, by a user display device and via a user interface, the technical debt score.

In an example, the comparing can further include searching the at least the portion of the object in the software platform for the at least one information characteristic described by the rule and resulting from a specific type of technical debt. In an example, the type of technical debt is at least one of: architecture debt, code debt, data debt, defect debt, design debt, documentation debt, governance debt, infrastructure debt, operations and maintenance debt, people debt, privacy protection debt, process debt, requirements debt, security debt, service debt, test automation debt, test debt, user experience debt, or a combination thereof.

In an example, the comparison can further include the rule initiating artificial intelligence searching of the object to identify the violation of the rule, where the artificial intelligence searching of the object can include performing a neural network convolution on information from the object being scanned. In an example, the at least one information characteristic can describe an artificial intelligence hallucination.

In an example, the comparing can be performed per object type.

In an example, the rule can further include information describing a weight to be afforded to the violation of the rule. An example, the weight can be per-technical debt type.

In an example, the rule can include information describing at least one of: a rule title, a rule type, at least one object which the rule can be compared, a respective remediation effort to cure the violation of the rule, a text description of the rule, a priority level of the rule, a keyword to be searched for during the comparing, an object type to which the rule applies, a candidate resolution approach to remediate a violation of the rule, a rule violation discovery approach, a scope of the rule, an application tag of the rule, an activation status of the rule, an inactivation status of the rule, a criticality of the rule, a source of the rule, if the rule is configured to automatically execute during the comparing, or a combination thereof. In an example, the method can further include displaying, by the user display device, the information describing the at least one of: the rule title, the rule type, the at least one object which the rule can be compared, the respective remediation effort to cure the violation of the rule, the text description of the rule, the priority level of the rule, the amount that the technical debt score must be changed for the violation of the rule, the technical debt score value change associated with the violation of the rule, the keyword to be searched for during the comparing, the object type to which the rule applies, the candidate resolution approach to remediate the violation of the rule, the rule violation discovery approach, the scope of the rule, the application tag of the rule, the activation status of the rule, the inactivation status of the rule, the criticality of the rule, the source of the rule, if the rule is configured to automatically execute during the comparing, or the combination thereof.

In an example, the method can further include (i) receiving, from a user input device, information describing a characteristic of the rule and (ii) storing, in a processor-readable storage device, the information describing the characteristic of the rule. In an example, the characteristic of the rule can describe a type of technical debt. The type of technical debt can be based on at least one of a system context or a technology context.

In an example, the method can further include storing, in a processor-readable storage device and in a catalog of rules, information describing the rule.

In an example, the method can further include displaying, by the user display device, information describing a characteristic of the rule.

In an example, the method can further include comprising displaying, by the user display device and via a heat map, respective technical debt scores per at least one of: application, type of technical debt, or remediation strategy.

In an example, the method can further include: (i) scaling the technical debt score to fit in a predetermined range and (ii) displaying, by the user display device and via the user interface, the converted technical debt score. The converted technical debt score can be: (i) for an application or (ii) a combined technical debt score for a defined plurality of applications.

In an example, the method can further include: (i) calculating a trend of the technical debt score over time and (ii) displaying, by the user display device and via the user interface, the trend of the technical debt score over time.

In an example, the method can further include: (i) categorizing respective technical debt scores per type of technical debt and priority and (ii) displaying, by the user display device, the respective technical debt scores per type and priority.

In an example, the method can further include: (i) calculating a per-object list of rule violations that contribute to the technical debt score and (ii) displaying, by the user display device, the per-object list of rule violations that contribute to the technical debt score.

In an example, the method can further include: (i) calculating, by respective technical debt type, a number of objects that violate any rule relating to the respective technical debt type and (ii) displaying, by the user display device and per the respective technical debt type, the number of objects violating any rule relating to the respective technical debt type.

In an example, the rule can include information describing at least one of: a respective remedial action, a per-object time estimate to resolve the rule violation, an estimated number of hours to resolve the rule violation, an estimated financial budget to resolve the rule violation, a name of person to assign to resolve the rule violation, a name of a group of people to assign to resolve the rule violation, or a combination thereof. In an example, the method can further include displaying, by the user display device, the information describing the at least one of: the respective remedial action, the per-object time estimate to resolve the rule violation, the estimated number of hours to resolve the rule violation, the estimated financial budget to resolve the rule violation, the name of person to assign to resolve the rule violation, the name of the group of people to assign to resolve the rule violation, or a combination thereof.

In examples, provided is a system configured to generate at least a portion of a technical debt management machine. The system can include (i) an electronic processor configured to execute a set of computer-executable instructions and (ii) a memory communicatively coupled to the electronic processor and storing the set of computer-executable instructions. The set of computer-executable instructions can be configured to cause the electronic processor to perform at least a portion of a method described herein.

In an example, provided is a system configured to automatically generate at least a portion of a technical debt management machine. The system can include: (i) an electronic processor configured to execute a set of computer-executable instructions and (ii) a memory communicatively coupled to the electronic processor and storing the set of computer-executable instructions. The set of computer-executable instructions can be configured to cause the electronic processor to: (i) compare, by the at least one processor and by automatically searching using a rule engine, information in at least a portion of an object in a software platform to a rule to identify a violation of the rule, where: (a) the rule describes at least one information characteristic whose presence in an object being scanned indicates technical debt and results in the violation of the rule and (b) the rule describes an amount that a technical debt score must be changed for the violation of the rule; (ii) change, responsive to the violation of the rule, the technical debt score by the amount the technical debt score must be changed for the violation of the rule; and (iii) display, by the user display device and via a user interface, the technical debt score.

In an example, the comparing can further include searching the at least the portion of the object in the software platform for the at least one information characteristic described by the rule and resulting from a specific type of technical debt. In an example, the type of technical debt can be at least one of: architecture debt, code debt, data debt, defect debt, design debt, documentation debt, governance debt, infrastructure debt, operations and maintenance debt, people debt, privacy protection debt, process debt, requirements debt, security debt, service debt, test automation debt, test debt, user experience debt, or a combination thereof.

In an example, the comparison can further include the rule initiating artificial intelligence searching of the object to identify the violation of the rule, where the artificial intelligence searching of the object can include performing a neural network convolution on information from the object being scanned. In an example, the at least one information characteristic can describe an artificial intelligence hallucination.

In an example, the comparing can be performed per object type.

In an example, the rule can further include information describing a weight to be afforded to the violation of the rule. The weight can be per-technical debt type.

In an example, the rule can include information describing at least one of: a rule title, a rule type, at least one object which the rule can be compared, a respective remediation effort to cure the violation of the rule, a text description of the rule, a priority level of the rule, a keyword to be searched for during the comparing, an object type to which the rule applies, a candidate resolution approach to remediate a violation of the rule, a rule violation discovery approach, a scope of the rule, an application tag of the rule, an activation status of the rule, an inactivation status of the rule, a criticality of the rule, a source of the rule, if the rule is configured to automatically execute during the comparing, or a combination thereof. In an example, the memory can further store instructions configured to cause the processor to display, by the user display device, the information describing the at least one of: the rule title, the rule type, the at least one object which the rule can be compared, the respective remediation effort to cure the violation of the rule, the text description of the rule, the priority level of the rule, the amount that the technical debt score must be changed for the violation of the rule, the technical debt score value change associated with the violation of the rule, the keyword to be searched for during the comparing, the object type to which the rule applies, the candidate resolution approach to remediate the violation of the rule, the rule violation discovery approach, the scope of the rule, the application tag of the rule, the activation status of the rule, the inactivation status of the rule, the criticality of the rule, the source of the rule, if the rule is configured to automatically execute during the comparing, or the combination thereof.

In an example, the memory can further store instructions configured to cause the processor to (i) receive, from a user input device, information describing a characteristic of the rule and (ii) store, in a processor-readable storage device, the information describing the characteristic of the rule.

In an example, the characteristic of the rule can describe a type of technical debt. The type of technical debt can be based on at least one of a system context or a technology context.

In an example, the memory can further store instructions configured to cause the processor to store, in a processor-readable storage device and in a catalog of rules, information describing the rule.

In an example, the memory can further store instructions configured to cause the processor to display, by the user display device, information describing a characteristic of the rule.

In an example, the memory can further store instructions configured to cause the processor to display, by the user display device and via a heat map, respective technical debt scores per at least one of: application, type of technical debt, or remediation strategy.

In an example, the memory can further store instructions configured to cause the processor to: (i) scale the technical debt score to fit in a predetermined range and (ii) display, by the user display device and via the user interface, the converted technical debt score. The converted technical debt score can be: (i) for an application or (ii) a combined technical debt score for a defined plurality of applications.

In an example, the memory can further store instructions configured to cause the processor to: (i) calculate a trend of the technical debt score over time and (ii) display, by the user display device and via the user interface, the trend of the technical debt score over time.

In an example, the memory can further store instructions configured to cause the processor to: (i) categorize respective technical debt scores per type of technical debt and priority and (ii) display, by the user display device, the respective technical debt scores per type and priority.

In an example, the memory can further store instructions configured to cause the processor to: (i) calculate a per-object list of rule violations that contribute to the technical debt score and (ii) display, by the user display device, the per-object list of rule violations that contribute to the technical debt score.

In an example, the memory can further store instructions configured to cause the processor to: (i) calculate, by respective technical debt type, a number of objects that violate any rule relating to the respective technical debt type and (ii) display, by the user display device and per the respective technical debt type, the number of objects violating any rule relating to the respective technical debt type.

In an example, the rule can include information describing at least one of: a respective remedial action, a per-object time estimate to resolve the rule violation, an estimated number of hours to resolve the rule violation, an estimated financial budget to resolve the rule violation, a name of person to assign to resolve the rule violation, a name of a group of people to assign to resolve the rule violation, or a combination thereof.

In an example, the memory can further store instructions configured to cause the processor to display, by the user display device, the information describing the at least one of: the respective remedial action, the per-object time estimate to resolve the rule violation, the estimated number of hours to resolve the rule violation, the estimated financial budget to resolve the rule violation, the name of person to assign to resolve the rule violation, the name of the group of people to assign to resolve the rule violation, or the a combination thereof.

Embodiments of the disclosed systems and methods are directed to processes and techniques, including at least partially automated processes and at least partially automated techniques, to generate at least a portion of a technical debt management machine. In some embodiments, the disclosed systems include computer architecture components that can provide interfaces, code snippets, data structures, and information relationships to enable generating at least a portion of a technical debt management machine.

In an embodiment, the disclosure is directed to an apparatus configured to generate at least a portion of a technical debt management machine.

The apparatus can include a non-transitory computer-readable medium storing a set of computer-executable instructions and an electronic processor or co-processors. When executed by the electronic processor or co-processors, the instructions cause the electronic processor or co-processors (or a device of which they are part) to perform a set of operations that implement an embodiment of the disclosed methods.

In an embodiment, the disclosure is directed to a non-transitory computer-readable medium storing a set of computer-executable instructions, where the set of instructions can be executed by an electronic processor or co-processors to cause the processor or co-processors (or a device of which the processor or co-processors are a constituent part) to perform a set of operations that implement an embodiment of the disclosed methods.

In an example, provided is a non-transitory computer-readable medium, comprising processor-executable instructions stored thereon configured to cause a processor to: (i) compare, by the processor and by automatically searching using a rule engine, information in at least a portion of an object in a software platform to a rule to identify a violation of the rule, where: (a) the rule describes at least one information characteristic whose presence in an object being scanned indicates technical debt and results in the violation of the rule and (b) the rule describes an amount that a technical debt score must be changed for the violation of the rule; (ii) change, responsive to the violation of the rule, the technical debt score by the amount the technical debt score must be changed for the violation of the rule; and (iii) display, by a user display device and via a user interface, the technical debt score.

In an example, the comparing can further include searching the at least the portion of the object in the software platform for the at least one information characteristic described by the rule and resulting from a specific type of technical debt.

In an example, the type of technical debt can be at least one of: architecture debt, code debt, data debt, defect debt, design debt, documentation debt, governance debt, infrastructure debt, operations and maintenance debt, people debt, privacy protection debt, process debt, requirements debt, security debt, service debt, test automation debt, test debt, user experience debt, or a combination thereof.

In an example, comparison can further include the rule initiating artificial intelligence searching of the object to identify the violation of the rule, where the artificial intelligence searching of the object can include performing a neural network convolution on information in the object being scanned. In an example, the at least one information characteristic can describe an artificial intelligence hallucination.

In an example, the comparing can be performed per object type.

In an example, the rule can further include information describing a weight to be afforded to the violation of the rule. The weight can be per-technical debt type.

In an example, the rule can include information describing at least one of: a rule title, a rule type, at least one object which the rule can be compared, a respective remediation effort to cure the violation of the rule, a text description of the rule, a priority level of the rule, a keyword to be searched for during the comparing, an object type to which the rule applies, a candidate resolution approach to remediate a violation of the rule, a rule violation discovery approach, a scope of the rule, an application tag of the rule, an activation status of the rule, an inactivation status of the rule, a criticality of the rule, a source of the rule, if the rule is configured to automatically execute during the comparing, or a combination thereof. In an example, the non-transitory computer-readable medium can further include processor-executable instructions stored thereon configured to cause the processor to display, by the user display device, the information describing the at least one of: the rule title, the rule type, the at least one object which the rule can be compared, the respective remediation effort to cure the violation of the rule, the text description of the rule, the priority level of the rule, the amount that the technical debt score must be changed for the violation of the rule, the technical debt score value change associated with the violation of the rule, the keyword to be searched for during the comparing, the object type to which the rule applies, the candidate resolution approach to remediate the violation of the rule, the rule violation discovery approach, the scope of the rule, the application tag of the rule, the activation status of the rule, the inactivation status of the rule, the criticality of the rule, the source of the rule, if the rule is configured to automatically execute during the comparing, or the combination thereof.

In an example, the non-transitory computer-readable medium can further include processor-executable instructions stored thereon configured to cause the processor to: (i) receive, from a user input device, information describing a characteristic of the rule and (ii) store, in a processor-readable storage device, the information describing the characteristic of the rule.

In an example, the characteristic of the rule can describe a type of technical debt. The type of technical debt can be based on at least one of a system context or a technology context.

In an example, the non-transitory computer-readable medium can further include processor-executable instructions stored thereon configured to cause the processor to store, in a processor-readable storage device and in a catalog of rules, information describing the rule.

In an example, the non-transitory computer-readable medium can further include processor-executable instructions stored thereon configured to cause the processor to cause the processor to display, by the user display device, information describing a characteristic of the rule.

In an example, the non-transitory computer-readable medium can further include processor-executable instructions stored thereon configured to cause the processor to cause the processor to display, by the user display device and via a heat map, respective technical debt scores per at least one of: application, type of technical debt, or remediation strategy.

In an example, the non-transitory computer-readable medium can further include processor-executable instructions stored thereon configured to cause the processor to: (i) scale the technical debt score to fit in a predetermined range and (ii) display, by the user display device and via the user interface, the converted technical debt score. The converted technical debt score can be: (i) for an application or (ii) a combined technical debt score for a defined plurality of applications.

In an example, the non-transitory computer-readable medium can further include processor-executable instructions stored thereon configured to cause the processor to: (i) calculate a trend of the technical debt score over time and (ii) display, by the user display device and via the user interface, the trend of the technical debt score overtime.

In an example, the non-transitory computer-readable medium can further include processor-executable instructions stored thereon configured to cause the processor to: (i) categorize respective technical debt scores per type of technical debt and priority and (ii) display, by the user display device, the respective technical debt scores per type and priority.

In an example, the non-transitory computer-readable medium can further include processor-executable instructions stored thereon configured to cause the processor to: (i) calculate a per-object list of rule violations that contribute to the technical debt score and (ii) display, by the user display device, the per-object list of rule violations that contribute to the technical debt score.

In an example, the non-transitory computer-readable medium can further include processor-executable instructions stored thereon configured to cause the processor to: (i) calculate, by respective technical debt type, a number of objects that violate any rule relating to the respective technical debt type and (ii) display, by the user display device and per the respective technical debt type, the number of objects violating any rule relating to the respective technical debt type.

In an example, the rule can include information describing at least one of: a respective remedial action, a per-object time estimate to resolve the rule violation, an estimated number of hours to resolve the rule violation, an estimated financial budget to resolve the rule violation, a name of person to assign to resolve the rule violation, a name of a group of people to assign to resolve the rule violation, or a combination thereof.

In an example, the non-transitory computer-readable medium can further include processor-executable instructions stored thereon configured to cause the processor to display, by the user display device, the information describing the at least one of: the respective remedial action, the per-object time estimate to resolve the rule violation, the estimated number of hours to resolve the rule violation, the estimated financial budget to resolve the rule violation, the name of person to assign to resolve the rule violation, the name of the group of people to assign to resolve the rule violation, or the a combination thereof.

In some embodiments, the systems and methods disclosed herein can provide services through a software as a service (SaaS), a multi-tenant platform, or a combination thereof. The multi-tenant platform can provide access to multiple entities (e.g. tenants), each with a separate account and associated data storage. Each account can correspond to a User, set of Users, an entity, a set or category of entities, a company, a business advisor, a set or category of Users, an industry, an organization, or a combination thereof, as examples. Each account can access one or more services, a set of which are instantiated in their account, and which implement at least a portion of one or more of the methods or functions disclosed herein.

The terms "invention," "the invention," "this invention," "the present invention," "the present disclosure," or "the disclosure" as used herein are intended to refer broadly to all subject matter disclosed in this document, the drawings (i.e. the Figures), and the claims. Statements containing these terms do not limit the subject matter disclosed or the meaning or scope of the claims. Embodiments covered by this disclosure are defined by the claims and not by this summary. This summary is a high-level overview of various examples and aspects of the disclosure and introduces some concepts that are further described in detail hereby. This summary is not intended to identify key, essential, or required features of the claimed subject matter, nor is it intended to be used in isolation to determine the scope of the claimed subject matter. The subject matter should be understood by reference to appropriate portions of the entire specification, to any or all figures or drawings, and to each claim.

Advantages of the provided systems, apparatuses, and methods will be apparent to one of ordinary skill in the art upon review of the detailed description and the included Figures. While the exemplary embodiments provided hereby are susceptible to various modifications and alternative forms, specific embodiments are shown by way of example in the drawings and are described in detail herein. However, the exemplary or specific embodiments are not intended to be limited to the forms described. Rather, the disclosure covers all modifications, equivalents, and alternatives falling within the scope of the appended claims.

BRIEF DESCRIPTION OF THE DRAWINGS

The accompanying drawings are presented to describe examples of the present teachings and are not limiting. Together with this following description, the drawings demonstrate and explain various principles of the present disclosure.

Embodiments of the disclosure are described with reference to the drawings, in which:

FIG. 4A is a diagram depicting an example user display or portion thereof with a home page of a graphical user interface of a technical debt management machine, in accordance with an embodiment of the disclosure.

FIG. 4D is a diagram depicting an example user display or portion thereof with a rule detail entry page of a graphical user interface of a technical debt management machine, in accordance with an embodiment of the disclosure.

FIG. 4E is a diagram depicting an example user display or portion thereof with a rule filter condition entry page of a graphical user interface of a technical debt management machine, in accordance with an embodiment of the disclosure.

FIG. 4F is a diagram depicting an example user display or portion thereof with a rule activation page of a graphical user interface of a technical debt management machine, in accordance with an embodiment of the disclosure.

FIG. 6 is a diagram depicting an example user display or portion thereof with a home page of a graphical user interface of a technical debt management machine, in accordance with an embodiment of the disclosure.

FIG. 7 is a diagram depicting an example user display or portion thereof with a search results page of a graphical user interface of a technical debt management machine, in accordance with an embodiment of the disclosure.

FIG. 9 is a diagram depicting an example user display or portion thereof with a search results page of a graphical user interface of a technical debt management machine, in accordance with an embodiment of the disclosure.

FIG. 12 is a diagram depicting an example user display or portion thereof with a search results page of a graphical user interface of a technical debt management machine, in accordance with an embodiment of the disclosure.

FIGS. 15A-15C are diagrams depicting example rule information of a technical debt management machine, in accordance with an embodiment of the disclosure.

Figure 1:
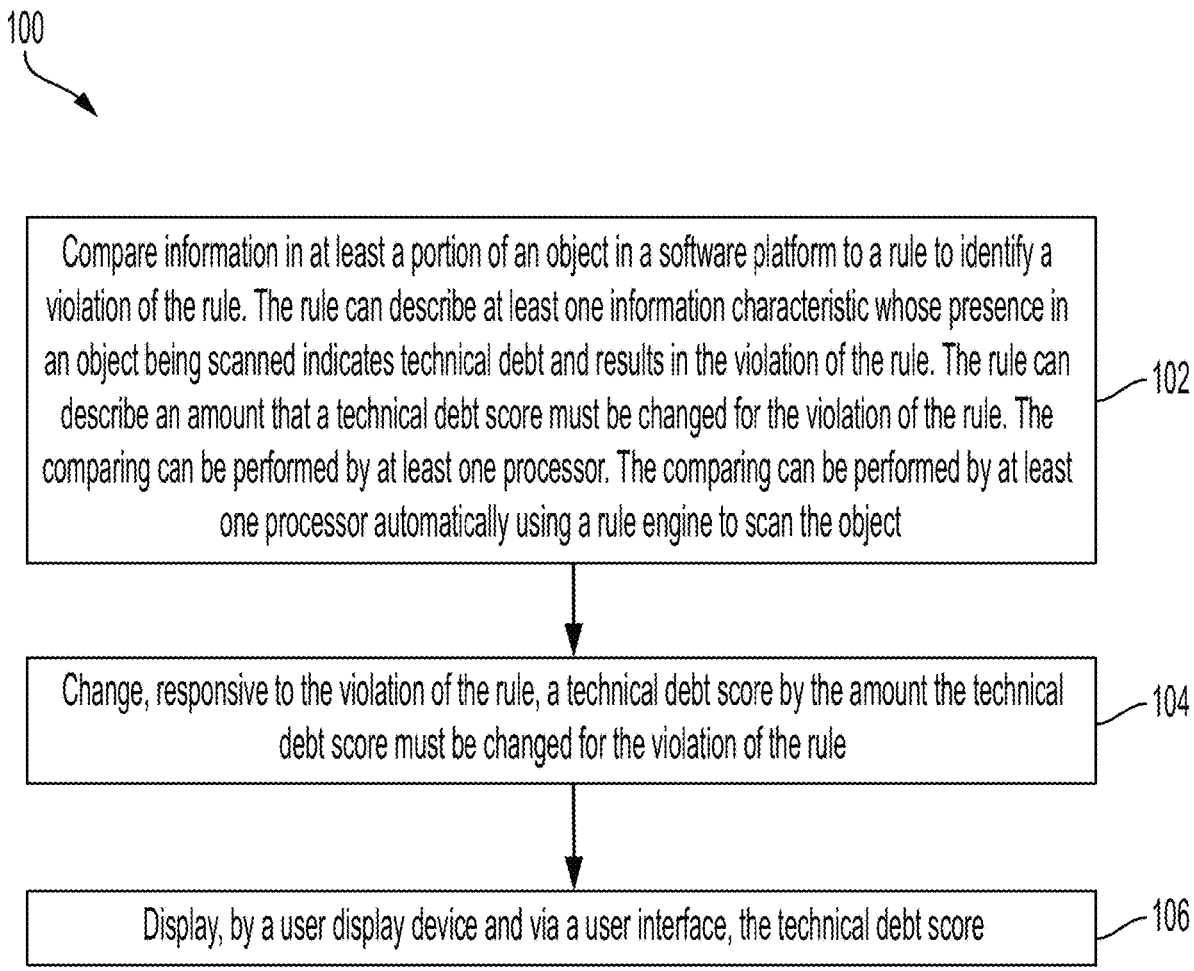
FIG. 1 depicts an example block diagram of an example method for generating at least a portion of a technical debt management machine, in accordance with an embodiment of the disclosure.

Each of the drawings is provided for illustration and description only and does not limit the present disclosure. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are example methods and apparatuses that can be used to automatically manage technical debt, which can include identifying technical debt, characterizing technical debt, measuring technical debt, classifying technical debt, analyzing technical debt, remediating technical debt, or combination thereof. In some examples, the provided methods and apparatuses can advantageously automatically generate a technical debt management machine, an information management machine, or both.

Technical debt produces identifiable characteristics in computer-executable instructions, outputs of executed computer-executable instructions, processor-executable instructions, outputs of executed processor-executable instructions, and combinations thereof. Non-limiting examples of the identifiable characteristics can include a presence of a type of instructions known to be produced by technical debt, a presence of a group of instructions known to be produced by technical debt, a presence of an instruction known to be produced by technical debt, or a combination thereof.

Non-limiting examples of the identifiable characteristics can include an absence of a type of required instruction that is typically absent due to technical debt, an absence of a group of required instructions that is typically absent due to technical debt, an absence of a required instruction that is typically absent due to technical debt, or a combination thereof.

Non-limiting examples of the identifiable characteristics can include an absence of a type of instruction that otherwise would be present if a best practice was followed, an absence of a group of instructions that otherwise would be present if a best practice was followed, an absence of a instruction that otherwise would be present if a best practice was followed, or a combination thereof.

Non-limiting examples of the identifiable characteristics can include an output produced by the presence of the type of instructions known to be produced by technical debt, an output produced by the group of instructions known to be produced by technical debt, an output produced by the instruction known to be produced by technical debt, or a combination thereof.

Non-limiting examples of the identifiable characteristics can include an output produced by the type of required instruction that is typically absent due to technical debt, an output produced by the group of required instructions that is typically absent due to technical debt, an output produced by the required instruction that is typically absent due to technical debt, or a combination thereof.

Non-limiting examples of the identifiable characteristics can include an output produced by the type of instruction that otherwise would be present if the best practice was followed, an output produced by the group of instructions that otherwise would be present if the best practice was followed, an output produced by the instruction that otherwise would be present if the best practice was followed, or a combination thereof.

The provided systems and methods can be configured to automatically search information for the identifiable characteristics. The information being searched can be in an object under test, a platform under test, or a combination thereof. In a nonlimiting example, the information being searched can, prior to the search process, be stored on a tangible processor-readable storage medium, a tangible computer-readable storage medium, or both. In a nonlimiting example, the information being searched can, during the search process, be retrieved from a tangible processor-readable storage medium, a tangible computer-readable storage medium, or both. In a nonlimiting example, the information being searched can, during the search process, be stored on a tangible processor-readable storage medium, a tangible computer-readable storage medium, or both. In a nonlimiting example, the information being searched can, following the search process, be stored on a tangible processor-readable storage medium, a tangible computer-readable storage medium, or both. The information being searched for an identifiable characteristic of technical debt can include a software object, computer code, computer software, a computer application, a database, a webpage, the like, or a combination thereof. Descriptions herein relating to searching objects also described searching platforms.

In examples, the automatic searching can include searching the information for presence of an identifiable characteristic in accordance with a rule. In a nonlimiting example, the rule can include rule information including at least one information characteristic whose presence in an object being searched indicates technical debt and results in a violation of the rule, an amount that a technical debt score must be changed for a violation of the rule, or a combination thereof.

When a rule is violated, the provided systems and methods can store a record of the violation (e.g. as search results). The record of the violation can include information describing the rule that was violated, the location of the violation in the information being searched, the amount that the technical debt score must be changed for the violation of the rule, rule information, or a combination thereof. In some examples, the violation of the rule triggers a change in the technical debt score by the amount that the technical debt score must be changed for the violation of the rule. Thus, the technical debt score can indicate a cumulative number of rule violations.

In some examples, when information is searched and no rules are violated, the provided systems and methods can store a record indicating no rules are violated by the information that was searched (e.g. as search results).

The search results can be automatically analyzed to characterize the rule violations. The rule violations can be characterized at least in part per at least one aspect of rule information of the violated rule. For example, the search results can be analyzed to determine a frequency of violation occurrence, a violation trend, aggregate violation characteristics, remediation requirements, a remediation budget, a person responsible for remediation (e.g., a developer, an architect, etc.), a number of rule violations per a respective rule criticality, a number of rule violations per respective rule type, or a combination thereof. In some examples, the provided systems and methods can produce a per-object list of rule violations that indicates a per-object identification of a presence of technical debt, characteristics of the technical debt, or a combination thereof. The provided systems and methods can classify objects by at least one aspect of rule information of the violated rule.

The analysis results can be displayed on a user interface device (e.g. a graphical user interface on a display device).

In some examples, the analysis results can automatically initiate sending a message to the person responsible for the remediation, where the message indicates the existence of the rule violation, a detail about the rule that is violated, a location of the identifiable characteristic in the information that was searched, or combination thereof. In some examples, the analysis results can automatically initiate scheduling a remediation action in a workflow schedule.

The provided systems and methods provide many advantages.

In examples, the provided systems and methods can advantageously automatically identify presence of technical debt and characterize the presence of technical debt. The provided systems and methods can also advantageously automatically search information to identify a presence and location of an identifiable characteristic technical debt. The provided systems and methods can advantageously analyze search results, display analysis results on a user interface device, identify a remediation technique, or combination thereof.

The provided systems and methods can advantageously receive user input describing rule information, deleting rule information, editing rule information, or a combination thereof. Thus, as identifiable characteristics of technical debt change over time, rules can be adapted accordingly.

In some embodiments, the disclosed systems and methods can advantageously efficiently and quickly generate at least a portion of a technical debt management machine, an information management machine, or both when compared to conventional techniques.

The provided systems and methods can advantageously mitigate technical debt and effects thereof, including and not limited to reducing product defects of a tangible device (e.g. improving computer functionality), improving performance of the tangible device, reducing costs associated with identifying and repairing computer functionality problems, causing tangible device to perform more predictably, causing a tangible device to perform less unpredictably, reducing a number of product updates to the tangible device, reducing a number of product release delays of the tangible device, reducing a length of a product release delay of the tangible device, and reducing repair costs of repairs to the tangible device, addressing the previously unaddressed and long felt industry needs identified in the background section herein, or a combination thereof.

In some examples, the provided systems and methods can advantageously provide a rule-based adaptive protection model.

FIG. 1 depicts an example block diagram of an example method 100 that can be used to implement generating at least a portion of a technical debt management machine, in accordance with an embodiment of the disclosure. In an embodiment, the method 100 can be implemented in a form of a set of computer-executable instructions. In examples, computer-executable instructions can include routines, programs, objects, components, data structures, procedures, operations, modules, functions, or a combination thereof, as non-limiting examples. Such computer-executable instructions can be executed by one or more programmed processors or co-processors.

The order in which the method 100 is described is not intended to be construed as a limitation, and any number of the described features can be combined in any order to implement the method 100 or alternate methods for automatically generating at least a portion of a process management machine. Additionally, individual features can be omitted, as is practicable, from the method 100 without departing from the scope of the subject matter described herein. Furthermore, the method 100 can be implemented in any suitable hardware, software, firmware, or a combination thereof, such as the apparatus described hereby.

As shown in FIG. 1, at step 102, one or more of the devices described herein can compare information in at least a portion of an object in a software platform to a rule to identify a violation of the rule. The comparing can be performed by at least one processor automatically searching using a rule engine. In examples, the rule can describe at least one information characteristic whose presence in an object being scanned indicates technical debt and results in the violation of the rule.

The violation of the rule can trigger a change in a technical debt score. In some examples, the rule can describe an amount the technical debt score must be changed for the violation of the rule. The amount the technical debt score must be changed for a rule violation can be rule-specific, with different rules having different respective amounts the technical debt score must be changed for respective rule violations.

In some examples, the comparing can further include searching the at least the portion of the object in the software platform for the at least one information characteristic described by the rule and resulting from a specific type of technical debt. In nonlimiting examples, the type of technical debt can be at least one of: architecture debt, code debt, data debt, defect debt, design debt, documentation debt, governance debt, infrastructure debt, operations and maintenance debt, people debt, privacy protection debt, process debt, requirements debt, security debt, service debt, test automation debt, test debt, or user experience debt.

In some embodiments, the comparison can include the rule initiating artificial intelligence searching of the object to identify the violation of the rule. The artificial intelligence searching of the object can include performing a neural network convolution on information from the object being scanned. Some examples, the at least one information characteristic can describe an artificial intelligence hallucination.

In an example, the comparing can be performed per object type.

A presence of some types of technical debt it is more impactful than a presence of other types of technical debt. In some embodiments, the rule can further include information describing a weight to be afforded to the violation of the rule. The weight can be per-technical debt type.

In some embodiments, the rule can include information describing at least one of: a rule title, a rule type, at least one object which the rule can be compared, a respective remediation effort to cure the violation of the rule, a text description of the rule, a priority level of the rule, a keyword to be searched for during the comparing, an object type to which the rule applies, a candidate resolution approach to remediate a violation of the rule, a rule violation discovery approach, a scope of the rule, an application tag of the rule, an activation status of the rule, an inactivation status of the rule, a criticality of the rule, a source of the rule, or if the rule is configured to automatically execute during the comparing. In some examples, the method can further include displaying, by the user display device, the information describing the at least one of: the rule title, the rule type, the at least one object which the rule can be compared, the respective remediation effort to cure the violation of the rule, the text description of the rule, the priority level of the rule, the amount that the technical debt score must be changed for the violation of the rule, the technical debt score value change associated with the violation of the rule, the keyword to be searched for during the comparing, the object type to which the rule applies, the candidate resolution approach to remediate the violation of the rule, the rule violation discovery approach, the scope of the rule, the application tag of the rule, the activation status of the rule, the inactivation status of the rule, the criticality of the rule, the source of the rule, or if the rule is configured to automatically execute during the comparing.

In some examples, the rule can include information describing at least one of: a respective remedial action, a per-object time estimate to resolve the rule violation, an estimated number of hours to resolve the rule violation, an estimated financial budget to resolve the rule violation, a name of person to assign to resolve the rule violation, a name of a group of people to assign to resolve the rule violation, or a combination thereof. In some examples, method can further include displaying, by the user display device, the information describing the at least one of: the respective remedial action, the per-object time estimate to resolve the rule violation, the estimated number of hours to resolve the rule violation, the estimated financial budget to resolve the rule violation, the name of person to assign to resolve the rule violation, the name of the group of people to assign to resolve the rule violation, or the combination thereof.

Some examples, the method can further include receiving user input information describing a characteristic of a rule, defining a rule, or both. The user input information can be received from a user input device, such as those described herein. The user input information describing the characteristic of the rule, defining the rule, or both can be stored in a processor-readable storage device, such as those described herein. In some examples, the characteristic of the rule can describe a type of technical debt. In an example, the type of technical debt can be based on a system context. An example, the type of technical debt can be based on a technology context.

The received user input information describing the characteristic of the rule, defining the rule, or both can be stored in a processor-readable storage device. In some examples, the received user input information can be stored in a catalog of rules. The catalog of rules can provide an organized index of rules by rule name, rule number, information describing at least one category of aspects of rules that is common to at least two rules, or a combination thereof.

Some examples, the method can further include displaying, by the user display device, the information describing the characteristic of the rule.

In some examples, the method can include retrieving the compared rule from a catalog of rules.

In some examples, rules can be categorized. Searches can be performed per category of rules. Subsequent analysis of search results can be performed per category of rules.

In some examples, at least a portion of the method 100 can be repeated following a change in rule information, addition of a new rule, deletion of a rule, or combination thereof.

As shown in FIG. 1, at step 104, one or more of the devices described herein can change, responsive to the violation of the rule, the technical debt score by the amount the technical debt score must be changed for the violation of the rule.

In some examples, the initial technical debt score prior to commencing the comparison in step 102 can be a relatively high value (e.g., 1, 10, 100, 1000, 10000, etc.), with the rule violation requiring decrementing the technical debt score. In some examples, the initial technical debt score prior to commencing the comparison in step 102 can be a relatively high percentage (e.g., 100 percent), with the rule violation requiring decrementing the technical debt score by at least a fraction of a percent. In some examples, the initial technical debt score prior to commencing the comparison in step 102 can be a relatively low value (e.g., zero), with the rule violation requiring incrementing the technical debt score. In some examples, the initial technical debt score prior to commencing the comparison in step 102 can be a relatively low percentage (e.g., zero percent), with the rule violation requiring incrementing the technical debt score by at least a fraction of a percent. Thus, the amount the technical debt score must be changed for a rule violation can be positive or negative.

In some examples, the amount the technical debt score must be changed for the violation of the rule can be weighted (e.g. incremented or decremented) in accordance with respective rule information describing a weight to apply or a violation of the rule.

As shown in FIG. 1, at step 106, one or more of the devices described herein can automatically display, by a user display device, the technical debt score. The technical debt score can be displayed via a user interface.

In some examples, the method can further include displaying, by the user display device and via a heat map, respective technical debt scores per application, type of technical debt, remediation strategy, or combination thereof. A heat map displaying respective technical debt scores per application can further display at least one type of technical debt per application. A heat map displaying respective technical debt scores per application can further display at least one type of remediation strategy per application. In some examples, the method can further include receiving user input describing a selection of an application depicted on a heat map, and in response further display at least one type of technical debt per the selected application. In some examples, the method can further include receiving user input describing a selection of an application depicted on a heat map, and in response further display at least one type of remediation strategy per the selected application.

In some examples, the heat map can indicate a presence of a type of technical debt, a presence of a quantity of technical debt (e.g., per object, per platform, per application, etc.). The heat map can use colors (e.g., black, white, gray, green, yellow, red, shades thereof, etc.), portions having an area proportional to a displayed characteristic, or combination thereof to distinguish between displayed characteristics.

In some embodiments, the technical debt score can be a total technical debt score for an entire platform. In some examples, the technical debt score can be a total technical debt score for an object.

In some examples, the method can further include scaling the technical debt score to fit in a predetermined range and thus produce a scaled technical debt score. For example, scaling can include converting the technical debt score from points to a percentage. The percentage can indicate a percentage of scanned objects that violate a specific rule. The percentage can indicate a percentage of scanned objects that do not violate the specific rule. The percentage can indicate a percentage of scanned objects that violate at least one rule. The percentage can indicate a percentage of scanned objects that do not violate any rules.

The scaled technical debt score can be displayed via the user display device (e.g. via a user interface). The scaled technical debt score can be calculated for a specific application. In some examples, the scaled technical debt score can be a combined technical debt score for a defined plurality of applications. In a non-limiting embodiment, the combined technical debt score can be calculated for a defined plurality of applications created by a specific organization. In a non-limiting embodiment, the combined technical debt score can be calculated for a defined plurality of applications implemented by a specific organization.

In some examples, the method can further include calculating a trend of the technical debt score over time. The trend of the technical debt score over time can be displayed by the user display device (e.g. via the user interface).

In some embodiments, the method can further include categorizing respective technical debt scores per type of technical debt and priority. The respective technical debt scores per type and priority can be displayed by the user display device (e.g. via the user interface).

In some examples, the method can further include calculating a per-object list of rule violations that contribute to the technical debt score. The per-object list of rule violations that contribute to the technical debt score can be displayed by the user display device (e.g. via the user interface).

In some examples, the method can further include calculating, by respective technical debt type, a number of objects that violate any rule relating to the respective technical debt type. The number of objects violating any rule relating to the respective technical debt type can be displayed by the user display device (e.g. via the user interface). The number of objects violating any rule relating to the respective technical debt type can be displayed by the user display device per the respective technical debt type.

In some examples, the method can further include calculating a ratio of a quantity of objects yielding rule violations to a quantity of objects that were scanned. The ratio can be displayed by the user display device.

In some examples, one or more of the devices described herein can store at least an aspect of the technical debt management machine (e.g., at least one rule, a comparison process, a user input, or a combination thereof) on a non-transitory computer-readable medium. In an example, the non-transitory computer-readable medium can be coupled to an electronic processor that is configured to execute at least a aspect of the technical debt management machine stored on the non-transitory computer-readable medium. In an example, the electronic processor can execute at least a portion of an aspect of the technical debt management machine stored on the non-transitory computer-readable medium.

In some examples, a result of applying the technical debt management machine to the at least one object can be stored on one or more of the devices described herein (e.g., on a non-transitory computer-readable medium). In nonlimiting examples, the stored result can include information describing at least one rule, a comparison result, a user input, a technical debt score, a result of a calculation performed on a technical debt score, a result of a violation of a rule, a remedial action recommendation resulting from a violation of the rule, or a combination thereof.

In examples, at least a portion of the technical debt management machine can be configured as a set of computer-executable instructions (e.g. software instructions), where the computer-executable instructions can be stored on a non-transitory computer-readable data storage device, a non-transitory computer-readable medium, or both.

Figure 2A:
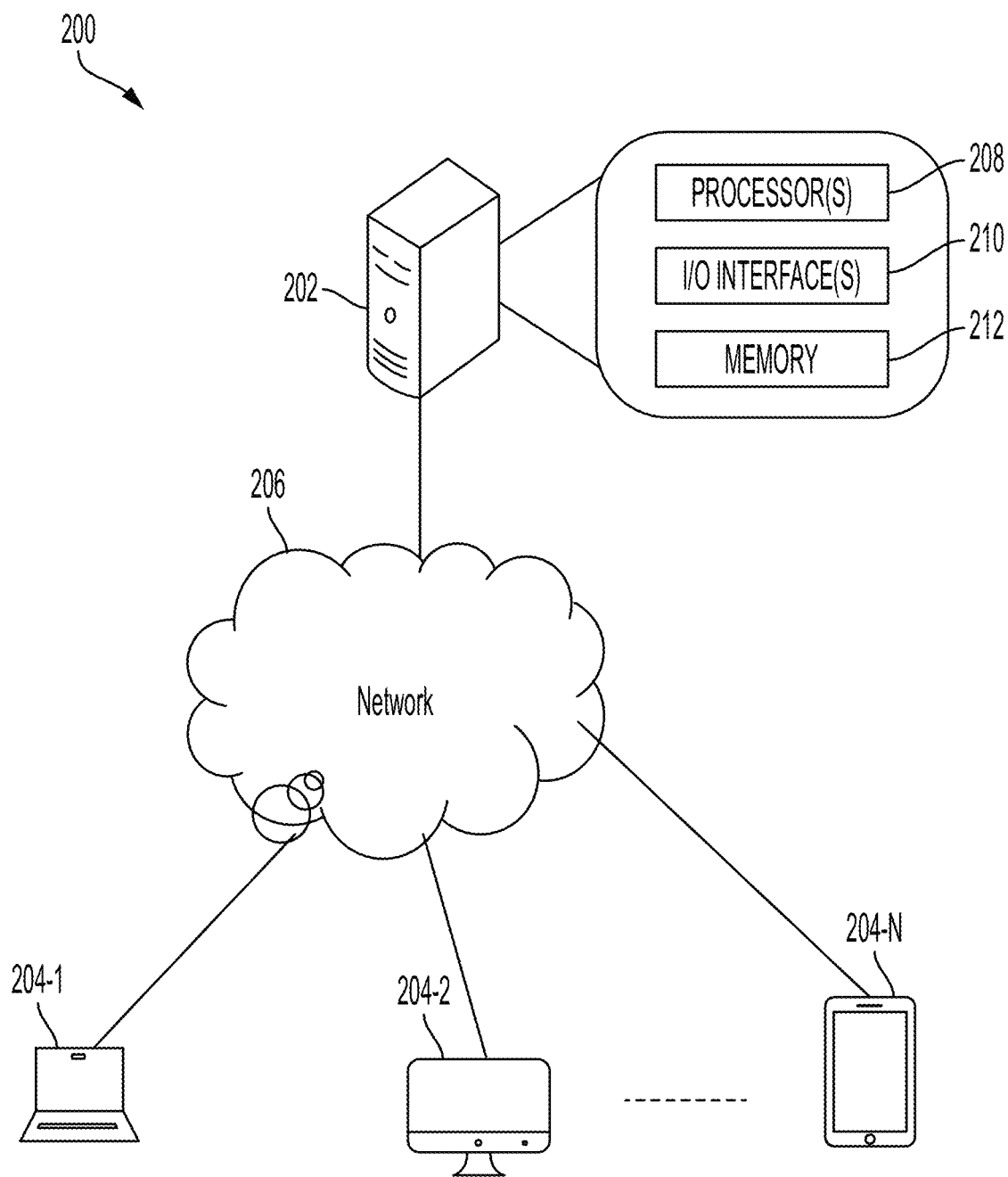
FIG. 2A depicts an example network implementation of a system suitable for implementing examples of the disclosed subject matter.

We now turn to FIG. 2A.

FIG. 2A depicts a network implementation 200 of a system 202. One or more users can access the system 202 through one or more user devices 204-1, 204-2 . . . 204-N, collectively referred to as user devices 204, hereinafter, or applications residing on the user devices 204.

Although the disclosure is explained considering that the system 202 is implemented on a server, the system 202 can be implemented in other forms of a computing device or system, such as a laptop computer, a desktop computer, a notebook, a workstation, a virtual environment, a mainframe computer, a server, a network server, or a cloud-based computing environment. It will be understood that the system 202 can be accessed by multiple users through one or more user devices 204-1, 204-2 . . . 204-N.

In one implementation, the system 202 can comprise a cloud-based computing environment in which the user can operate individual computing systems configured to execute remotely located applications. Examples of the user devices 204 can include, but are not limited to, a portable computer, a personal digital assistant, a handheld device, a workstation, or a combination thereof. The user devices 204 can be communicatively coupled to the system 202 through a network 206.

In one implementation, the network 206 can be a wireless network, a wired network, or a combination thereof. The network 206 can be implemented as one of several different types of networks, including but not limited to an intranet, local area network (LAN), wide area network (WAN), the Internet, or a combination thereof. The network 206 can be a dedicated network or a shared network. A shared network can be an association of different types of networks that use a variety of protocols, for example, Hypertext Transfer Protocol (HTTP), Transmission Control Protocol/Internet Protocol (TCP/IP), or Wireless Application Protocol (WAP) to communicate with one another. Further, the network 206 can include a variety of network devices, including routers, bridges, servers, computing devices, storage devices, or a combination thereof.

In an embodiment, system 202 can include at least one processor 208, an input/output (I/O) interface 210, and a memory 212. The processor 208 can be implemented as one or more microprocessors, microcomputers, microcontrollers, digital signal processors, Central Processing Units (CPUs), state machines, logic circuitries, devices that manipulate signals based on operational instructions, or a combination thereof. Among other capabilities, the at least one processor 208 can be configured to fetch and execute computer-readable instructions stored in the memory 212.

The in/out (I/O) interface 210 can include software and hardware interfaces, for example, a web interface, a graphical user interface (GUI, UI), and the like. The I/O interface 210 can allow the system 202 to interact with the user directly or through at least one of the client devices 204-1 to 204-N. Further, the I/O interface 210 can enable the system 202 to communicate with other computing devices, such as web servers and external data servers (not shown). The I/O interface 210 can facilitate communications and data transfer within a wide variety of networks and protocol types, including wired networks (for example, Local Area Network or cable) and wireless networks (such as wireless local area network, a cellular network, or a satellite network). The I/O interface 210 can include one or more ports for connecting a number of devices to one another or to another server.

The memory 212 can include a computer-readable medium or computer program product. Non-limiting examples include volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 212 can include routines, programs, objects, instructions, modules, components, or data structures which perform particular tasks or implement particular abstract data types. The memory 212 can include programs or instructions that supplement applications and functions of the system 202. In an embodiment, the memory 212 can serve as a repository for storing data processed, received, generated or a combination thereof by one or more programs or coded instructions.

Figure 2B:
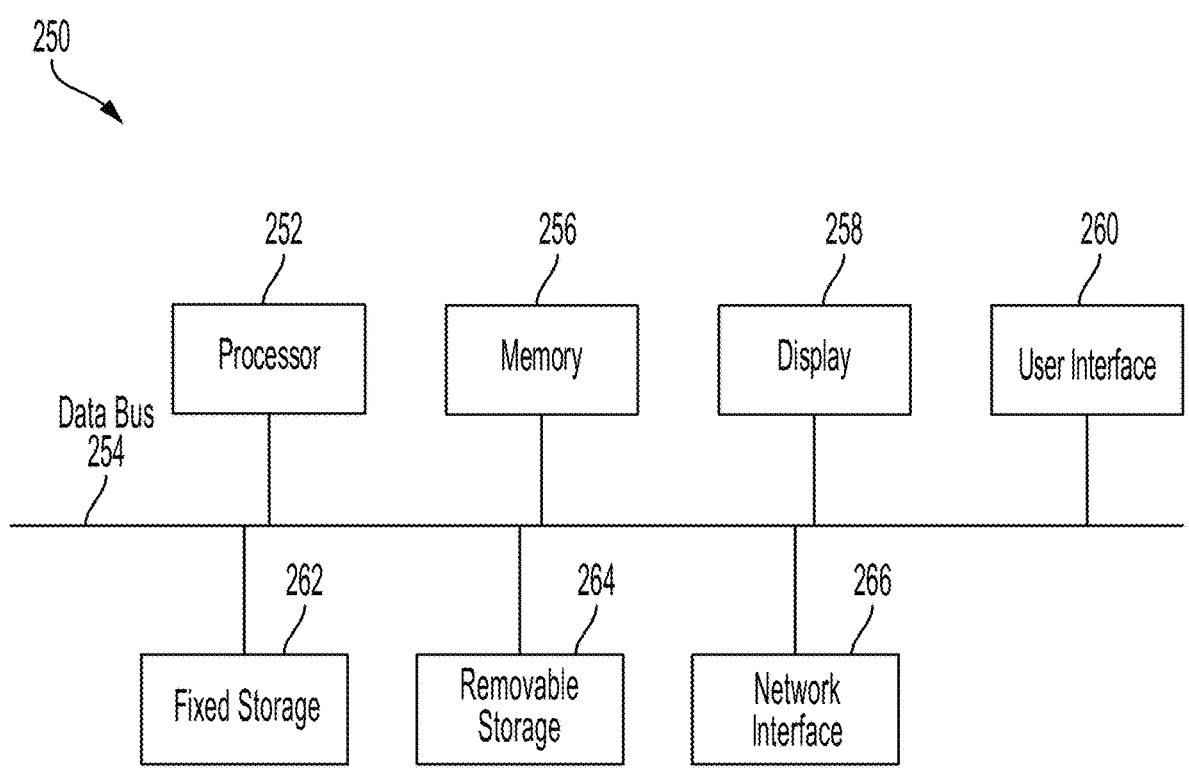
FIG. 2B depicts an example diagram of an example computing device suitable for implementing examples of the disclosed subject matter.

We now turn to FIG. 2B.

FIG. 2B depicts an example diagram of an example computing device 250 suitable for implementing examples of the disclosed subject matter. For example, at least a portion of the computing device 250 can be suitable for use as a component part of the system 202, at least one of the user devices 204-1 to 204-N, or a combination thereof. In another example, at least a portion of the computing device 250 can be coupled to the network 206.

In examples, a process management machine can include at least a portion of the example computing device 250, at least a portion of the system 202, or both, configured with computer-executable instructions to perform at least a portion of a technique described hereby, where the computer-executable instructions can be stored on a non-transitory computer-readable data storage device, a non-transitory computer-readable medium, or both.

In examples, aspects of the computing device 250 can be implemented at least in part in a desktop computer, a laptop computer, a server, a mobile device, a special-purpose computer, a non-generic computer, an electronic device described hereby (as is practicable), the like, or a combination thereof. In some examples, the disclosed subject matter can be implemented in, and used with, hardware devices, computer network devices, the like, or a combination thereof. The configuration depicted in FIG. 2B is an illustrative example and is not limiting.

In some examples, the computing device 250 can include a processor 252, a data bus 254, a memory 256, a display 258, a user interface 260, a fixed storage device 262, a removable storage device 264, a network interface 266, the like, or a combination thereof. These elements are described in further detail herein.

The processor 252 can be a hardware-implemented processing unit configured to control at least a portion of operation of the computing device 250. The processor 252 can perform logical and arithmetic operations based on processor-executable instructions stored within the memory 256. The processor 252 can be configured to execute instructions that cause the processor 252 to initiate at least a part of a method described hereby. In an example, the processor 252 can interpret instructions stored in the memory 256 to initiate at least a part of a method described hereby. In an example, the processor 252 can execute instructions stored in the memory 256 to initiate at least a part of a method described hereby. The instructions, when executed by the processor 252, can transform the processor 252 into a special-purpose processor that causes the processor to perform limited functions including at least a part of a function described hereby. The processor 252 can also be referred to as a central processing unit (CPU), a special-purpose processor (e.g. a non-generic processor), or both.

In some examples, the computing device 250 can implement machine-learning techniques (e.g. using a Convolutional Neural Network (CNN), etc.) to collect information, process information, or both. In some examples, information stored in an information storage device of the computing device 250 can be transferred to another computing device.

The processor 252 can comprise or be a component of a physical processing system implemented with one or more processors. In some examples, the processor 252 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The data bus 254 can couple components of the computing device 250. The data bus 254 can enable information communication between the processor 252 and one or more components coupled to the processor 252. In some examples, the data bus 254 can include a data bus, a power bus, a control signal bus, a status signal bus, the like, or a combination thereof. In an example, the components of the computing device 250 can be communicatively coupled together to communicate with each other using a different suitable mechanism.

The memory 256 generally represents any type or form of volatile storage device, non-volatile storage device, medium, the like, or a combination thereof. The memory 256 can store data (e.g. a database), processor-readable instructions, the like, or a combination thereof. In an example, the memory 256 can store data, load data, maintain data, or a combination thereof. In an example, the memory 256 can store processor-readable instructions, load processor-readable instructions, maintain processor-readable instructions, or a combination thereof. In some embodiments, the memory 256 can store computer-readable instructions configured to cause a processor (e.g. the processor 252) to initiate performing at least a portion of a method described hereby. The memory 256 can be a main memory configured to store an operating system, an application program, the like, or a combination thereof. The memory 256 can store a basic input-output system (BIOS) which can control basic hardware operation such as interaction of the processor 252 with peripheral components. The memory 256 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 256 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof which is configured to store information (e.g., data, processor-readable instructions, software, a database, the like, or a combination thereof) and is configured to provide the information to the processor 252.

The display 258 (i.e. a user display device) can include a component configured to visually convey information to a user of the computing device 250. In examples, the display 258 can be a video display screen, such as a light-emitting diode (LED) screen, a touch screen, or both. In examples, the display 258 can display, such as via a user interface, information described herein, information produced by at least a portion of a method described herein, or both. In examples, the display 258 can display a graphical user interface (GUI).

The user interface 260 can include user devices such as a switch, a computer mouse, a trackpad, a keypad, a keyboard, a touch screen, a microphone, a speaker, an audio production device, a camera, a jack for coupling the computing device to an audio production device, the like, or a combination thereof. The user interface 260 can optionally include a user interface controller. The user interface 260 can include a component configured to convey information to a user of the computing device 250, a component configured to receive information from the user of the computing device 250, or both. In examples, the user interface 260 can include the display 258.

The fixed storage device 262 can include one or more hard drive, flash storage device, the like, or a combination thereof. The fixed storage device 262 can be an information storage device (e.g. storing a database) that is not configured to be removed during use. The fixed storage device 262 can optionally include a fixed storage device controller. The fixed storage device 262 can be integral with the computing device 250 or can be separate and accessed through an interface.

The removable storage device 264 can be integrated with the computing device 250 or can be separated and accessed through other interfaces. The removable storage device 264 can be an information storage device (e.g. storing a database) that is configured to be removed during use, such as a memory card, a jump drive, a flash storage device, an optical disk, the like, or a combination thereof. The removable storage device 264 can optionally include a removable storage device controller. The removable storage device 264 can be integrated with the computing device 250 or can be separate and accessed through an interface.

In examples, a computer-readable storage medium such as one or more of the memory 256, the fixed storage device 262, the removable storage device 264, a remote storage location, the like, or a combination thereof can store non-transitory computer-executable instructions configured to cause a processor (e.g. the processor 252) to implement at least an aspect of the present disclosure.

The network interface 266 can couple the processor 252 (e.g. via the data bus 254) to a network and enable exchanging information between the processor 252 and the network. In some examples, the network interface 266 can couple the processor 252 (e.g. via the data bus 254) to the network and enable exchanging information between the processor 252 and another computing device. For example, the network interface 266 can enable the processor 252 to communicate with one or more other network devices. The network interface 266 can couple to the network using any suitable technique and any suitable protocol. In some examples, the network interface 266 can include a data bus, a power bus, a control signal bus, a status signal bus, the like, or a combination thereof. Example techniques and protocols the network interface 266 can be configured to implement include digital cellular telephone, WiFi™, Bluetooth®, near-field communications (NFC), the like, or a combination thereof.

The network can couple the processor 252 to one or more other network devices. In some examples, the network can enable exchange of information between the processor 252 and the one or more other network devices. In some examples, the network can enable exchange of information between the processor 252 and another computing device. The network can include one or more private networks, local networks, wide-area networks, the Internet, other communication networks, the like, or a combination thereof. In some examples, the network can be a wired network, a wireless network, an optical network, the like, or a combination thereof.

In some embodiments, the network device can store computer-readable instructions configured to cause a processor (e.g. the processor 252) to initiate performing at least a portion of a method described hereby. In an example, the one or more other network devices can store non-transitory computer-executable instructions configured to cause a processor (e.g. the processor 252) to implement at least an aspect of the present disclosure. The non-transitory computer-executable instructions can be received by the processor 252 and implemented using at least a portion of techniques described hereby. In another example, information described hereby can be stored in the fixed storage device 262, the removable storage device 264, the network device, the like, or a combination thereof.

Figure 3:
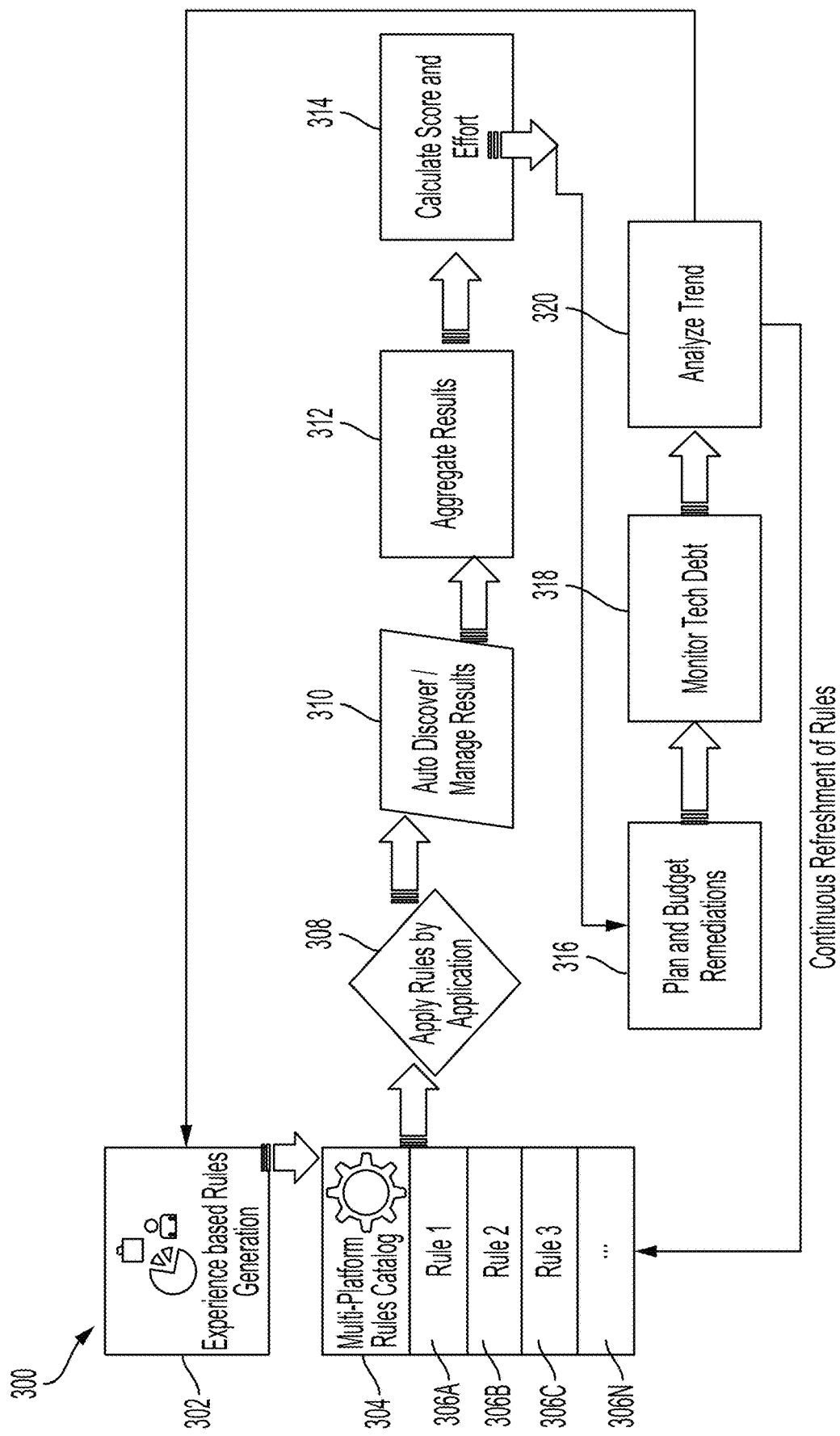
FIG. 3 is a diagram depicting a portion of an example method for generating and using at least a portion of a technical debt management machine, in accordance with an embodiment of the disclosure.

We now turn to FIG. 3.

FIG. 3 is a diagram depicting a portion of an example method 300 for generating and using at least a portion of a technical debt management machine, in accordance with an embodiment of the disclosure.

As shown in FIG. 3, at step 302, one or more of the devices described herein can receive information describing at least a portion of an aspect of a rule. In some examples, the received information describing at least the portion of the aspect of the rule can be in a computer-readable digital format stored on a non-transitory computer readable medium. In some examples, the received information describing at least the portion of the aspect of the rule can be received at the device via a user interface (e.g. via a graphical user interface). In some examples, the received information describing at least the portion of the aspect of the rule can be created by a user based upon the user's experience.

As shown in FIG. 3, at step 304, one or more of the devices described herein can store the information describing at least the portion of the aspect of the rule in a catalog of rules (e.g. in a computer-readable digital format stored on a non-transient computer readable medium). The catalog of rules can organize and store rule-related information that is organized per rule. The catalog of rules can store information describing multiple rules (e.g., "Rule 1" 306A, "rule 2" 306B, "rule 3" 306C, . . . "Rule N" 306N).

As shown in FIG. 3, at step 308, one or more of the devices described herein can apply a rule on a per-application basis, such as by searching information describing at least a portion of computer-executable instructions (e.g. code) of the application, information describing a computer-generated output of the application, or both. In an example, the searching can be performed using a rule engine.

As shown in FIG. 3, at step 310, one or more of the devices described herein can store information describing results of the searching in step 308 in a computer-readable digital format stored on a non-transient computer readable medium.

As shown in FIG. 3, at step 312, one or more of the devices described herein can aggregate the information describing the results of the scanning. The aggregating can be on a per-rule basis, on a per-application basis, on a per-rule aspect basis, on a per-application aspect basis, on a per-object basis, on a per-rule type basis, on a technical debt type basis, on a technical debt indicator basis, on a per-scope basis, on a per-object type basis, on a per priority level basis, on a per criticality basis, or a combination thereof. information describing results of the aggregating can be stored in a computer-readable digital format stored on a non-transient computer readable medium.

As shown in FIG. 3, at step 314, one or more of the devices described herein can calculate a technical debt score from the results of the searching in step 308 and based upon a violation of a rule applied during the scanning. In some examples, remediation-related efforts can be identified from the results of the searching in step 308 and based upon the violation of the rule applied during the scanning.

In examples, a rule can include information describing an amount that a technical debt score must be changed for a violation of the rule and, responsive to the violation of the rule, the technical debt score is changed accordingly.

As shown in FIG. 3, at step 316, one or more of the devices described herein can identify information describing planning remediation, budget-related remediation, or both from the results of the searching in step 308 and based upon the violation of the rule applied during the scanning.

A rule can have associated information describing a remediation activity that can be performed to mitigate the violation of the rule, to resolve violation of the rule, or both. A rule can have associated information describing a budget for remediation activity that can be performed to mitigate the violation of the rule, to resolve violation of the rule, or both. The budget for the remediation activity can describe a remediation time (e.g., in minutes, hours, days, or a combination thereof), a remediation cost, or a combination thereof. When multiple violations of a rule occur, a combined budget for remediation activities can be calculated by multiplying the number of violations by the budget for the remediation activity. Information describing a remediation activity can include an estimated start date to start remediation activity, start date by which remediation activity must be started, an estimated end date of remediation activity, an end date by which remediation activity must be completed, or a combination thereof.

As shown in FIG. 3, at step 318, one or more of the devices described herein can repeat the searching of step 308 and calculating of step 314 over time to monitor changes in technical debt. Step 318 can optionally include performing step 312, step 316, or both.

As shown in FIG. 3, at step 320, subsequent to performing step 318, one or more of the devices described herein can calculate information describing a trend over time in the technical debt score, planning remediation, budget-related remediation, or a combination thereof. In an example, the information describing the trend can be displayed by a user device and via a graphical user interface. The trend can be displayed in a tabular form, a graphical form, or a combination thereof.

In an example, information describing the trend can be used to adjust an aspect of rule, evaluate the efficacy of rule, evaluate the accuracy of a rule, or a combination thereof.

We now turn to FIGS. 4A-4F.

FIGS. 4A-4F are diagrams depicting a non-limiting example user interface 400 including a user display or portion thereof 402 with examples of pages of a graphical user interface of a technical debt management machine, in accordance with an embodiment of the disclosure.

Figure 4A:
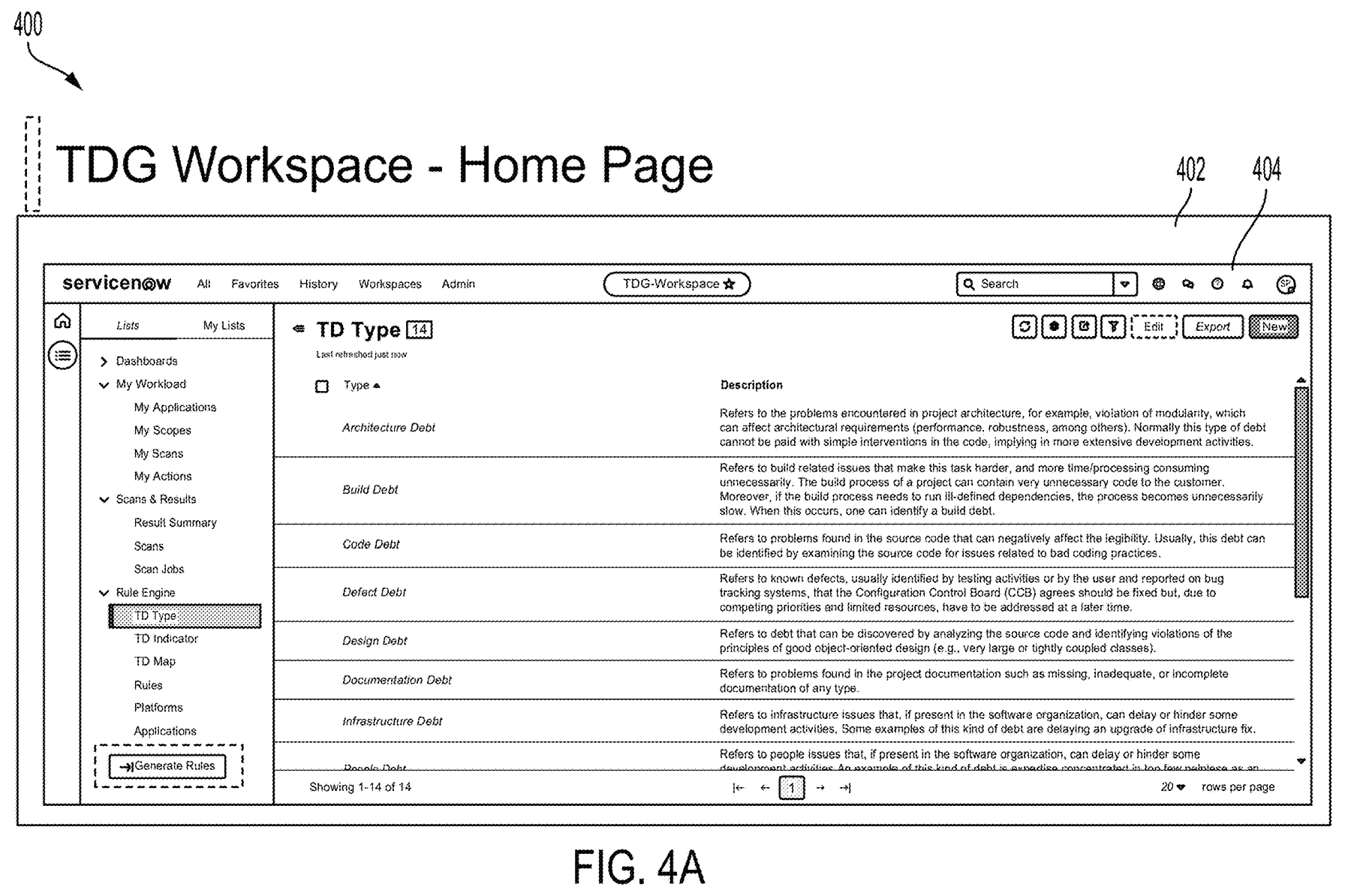

FIG. 4A is a diagram depicting the non-limiting example user interface 400 including the user display or portion thereof 402 with a home page 404 of a graphical user interface of a technical debt management machine, in accordance with an embodiment of the disclosure.

The home page 404 can include information describing a dashboard, workload actions that are in progress, information describing scans, information describing search results, or a combination thereof. The home page 404 can include information describing aspects of rule engine, including types of technical debt that the rule engine can detect. The home page 404 can also include information describing a technical debt indicator, a technical debt map, a rule, a platform that can be scanned, an application to which the rule engine can be applied, or combination thereof.

Figure 4B:
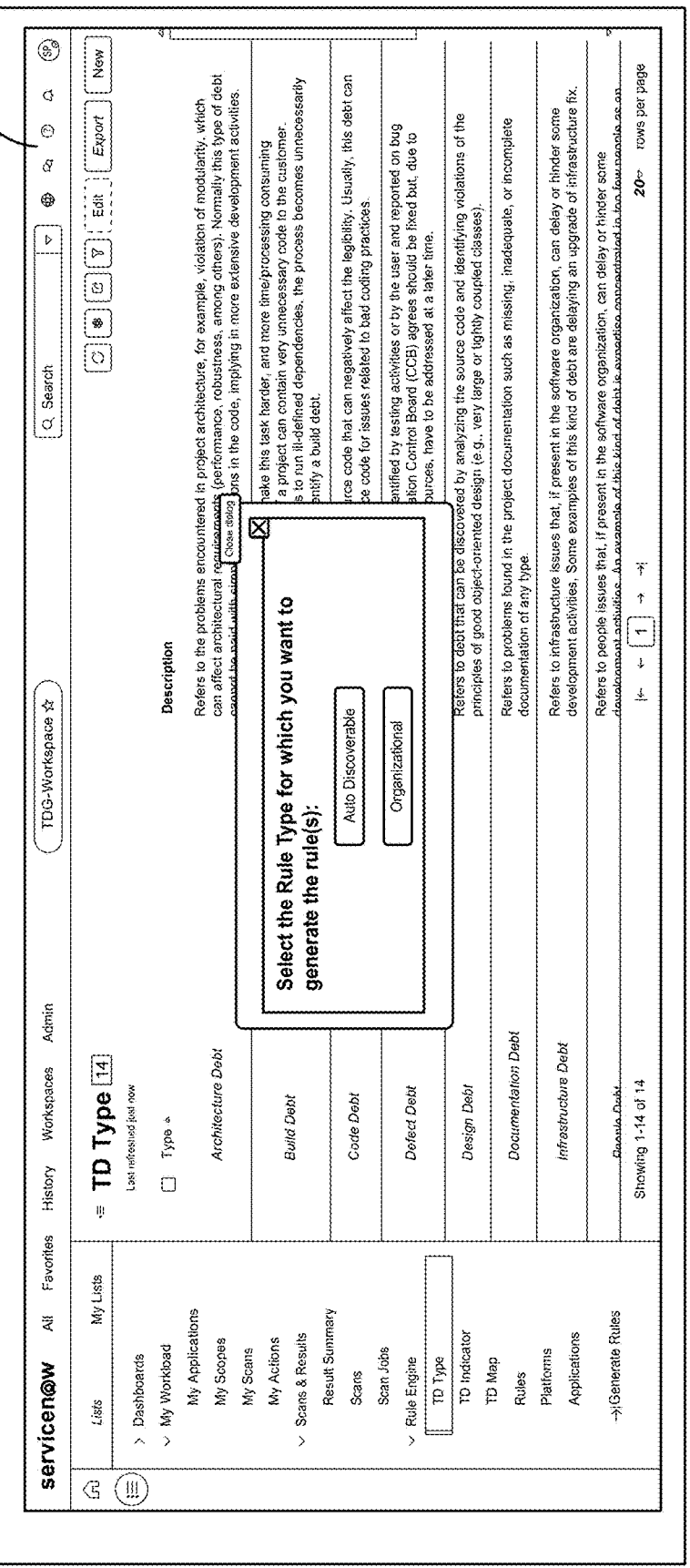
FIG. 4B is a diagram depicting an example user display or portion thereof with a rule type selection page of a graphical user interface of a technical debt management machine, in accordance with an embodiment of the disclosure.

FIG. 4B is a diagram depicting the non-limiting example user interface 400 including the user display or portion thereof 402 with a rule type selection page 406 of a graphical user interface of a technical debt management machine, in accordance with an embodiment of the disclosure.

Figure 4C:
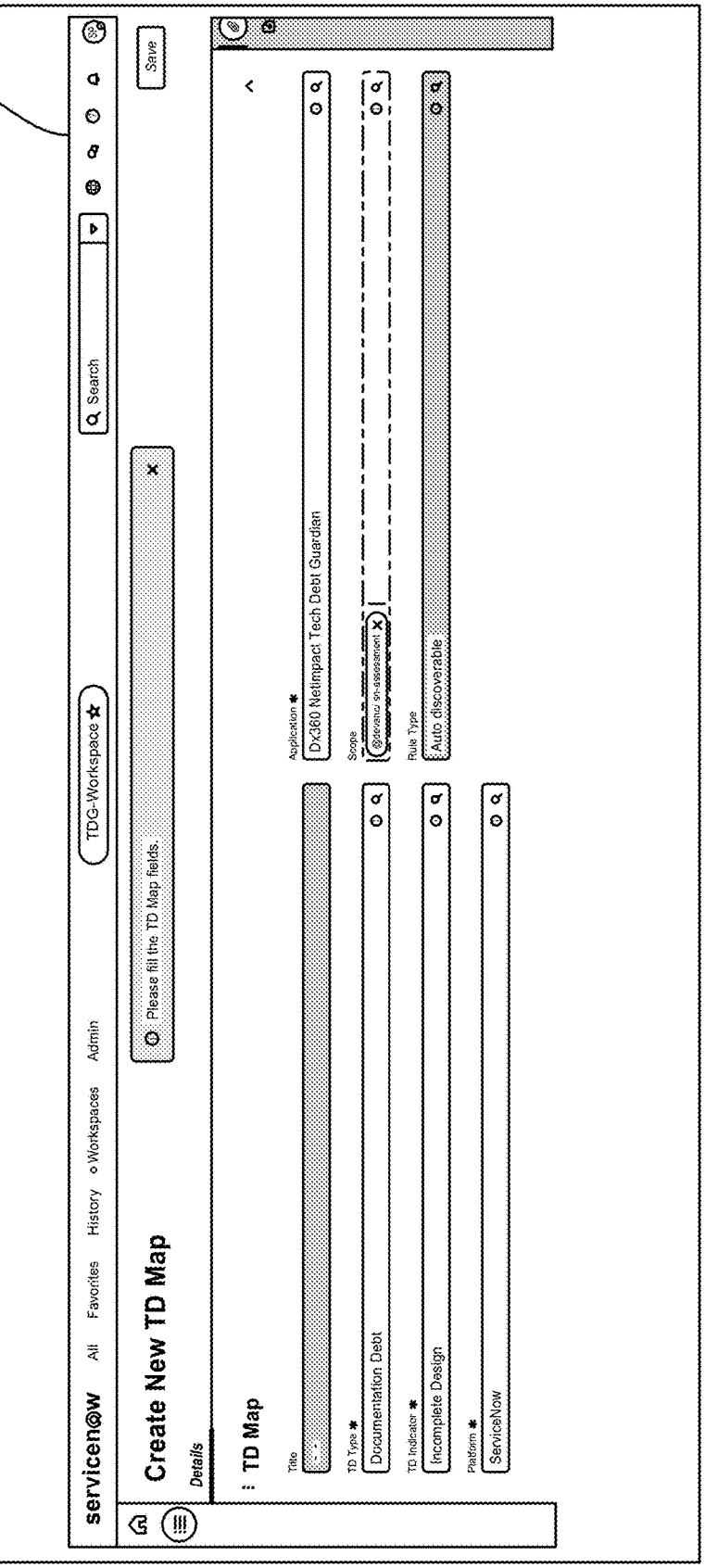
FIG. 4C is a diagram depicting an example user display or portion thereof with a technical debt map creation page of a graphical user interface of a technical debt management machine, in accordance with an embodiment of the disclosure.

FIG. 4C is a diagram depicting the non-limiting example user interface 400 including the user display or portion thereof 402 with a technical debt map creation page 408 of a graphical user interface of a technical debt management machine, in accordance with an embodiment of the disclosure.

The technical debt map creation page 408 can provide a user interface to enable a user to input information that creates a technical debt map. The technical debt map creation page 408 can include drop-down boxes, radio buttons, etc. to enable the user to enter information describing aspects of the technical debt map. The aspects of the technical debt map can include, and are not limited to, a technical debt type, a technical debt indicator, a platform name, an application name, a scope of the technical debt map, a rule type, or a combination thereof.

Figure 4D:
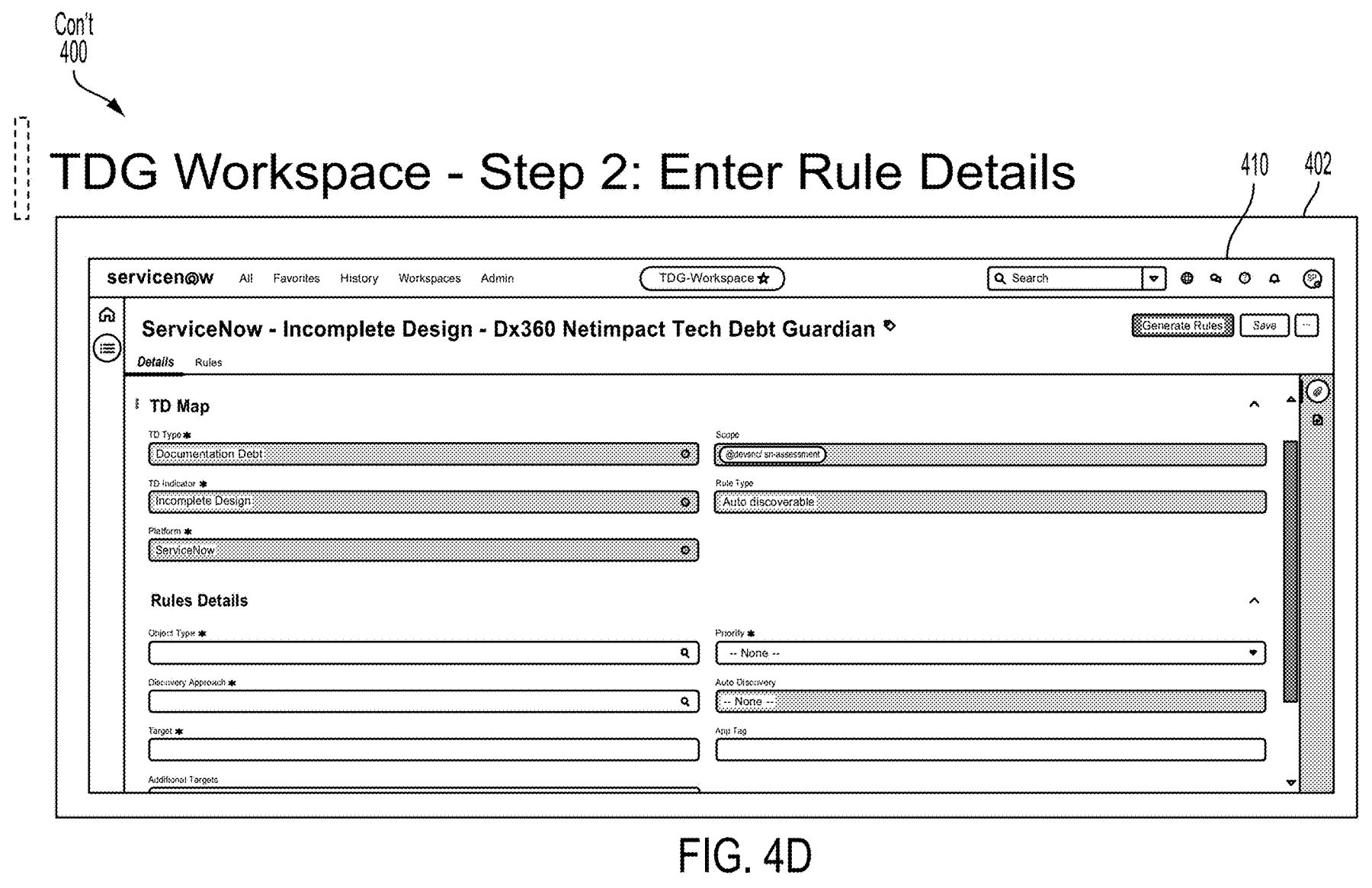

FIG. 4D is a diagram depicting the non-limiting example user interface 400 including the user display or portion thereof 402 with a rule detail entry page 410 of a graphical user interface of a technical debt management machine, in accordance with an embodiment of the disclosure.

The technical rule detail entry page 410 can provide a user interface to enable a user to input information that creates or updates a rule. The technical rule detail entry page 410 can include drop-down boxes, radio buttons, etc. to enable the user to enter information describing aspects of the rule. The aspects of the rule can include, and are not limited to, a rule title, a rule weight, a rule priority level, a rule criticality, an amount by which a technical debt score is changed per violation of the rule, an object type, a discovery approach, a target, a priority, a capability of the rule to automatically discover a violation of the rule, an application tag, or a combination thereof.

Figure 4E:
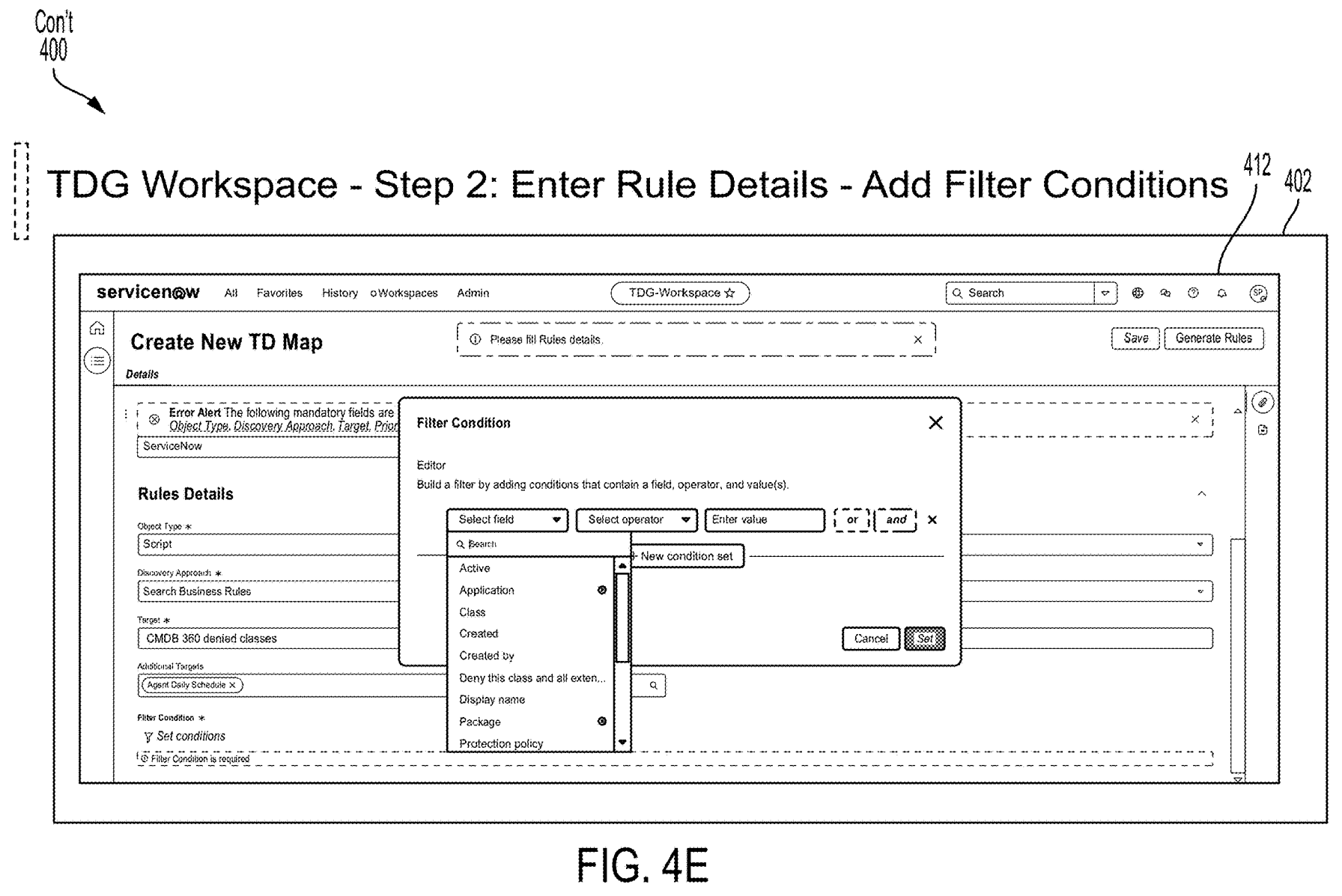

FIG. 4E is a diagram depicting the non-limiting example user interface 400 including the user display or portion thereof 402 with a rule filter condition entry page 412 of a graphical user interface of a technical debt management machine, in accordance with an embodiment of the disclosure.

The rule filter condition entry page 412 can provide a user interface to enable a user to input information that creates or updates a rule. The rule filter condition entry page 412 can include drop-down boxes, radio buttons, etc. to enable the user to enter information describing aspects of the filter condition. The aspects of the filter condition can include, and are not limited to, an aspect of the rule, an operator, and a value.

Figure 4F:
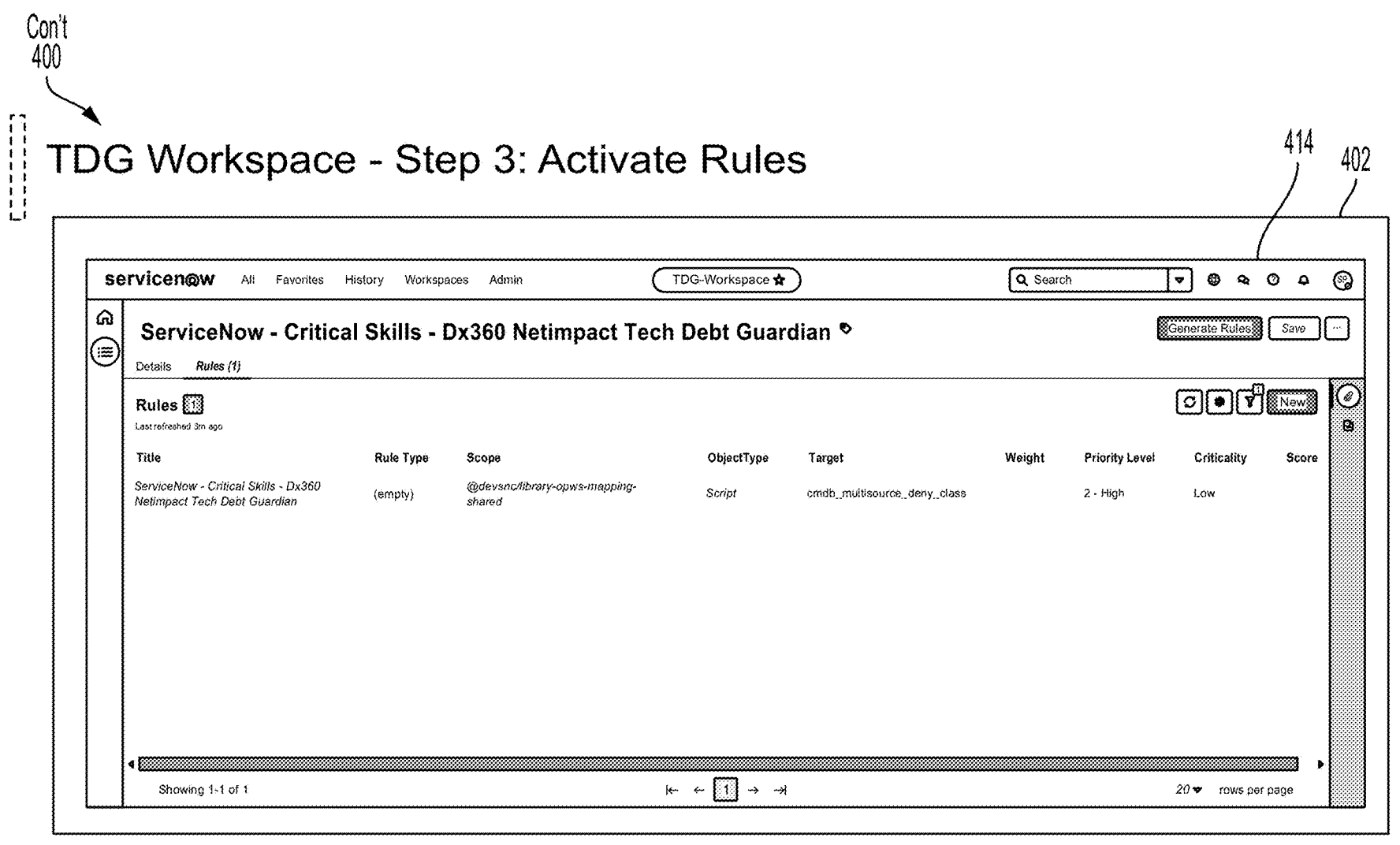

FIG. 4F is a diagram depicting the non-limiting example user interface 400 including the user display or portion thereof 402 with a rule activation page 414 of a graphical user interface of a technical debt management machine, in accordance with an embodiment of the disclosure. The rule activation page 414 can provide a user interface to enable a user to activate a rule. The rule activation page 414 can include drop-down boxes, radio buttons, etc. to enable the user to activate the rule.

Figure 5:
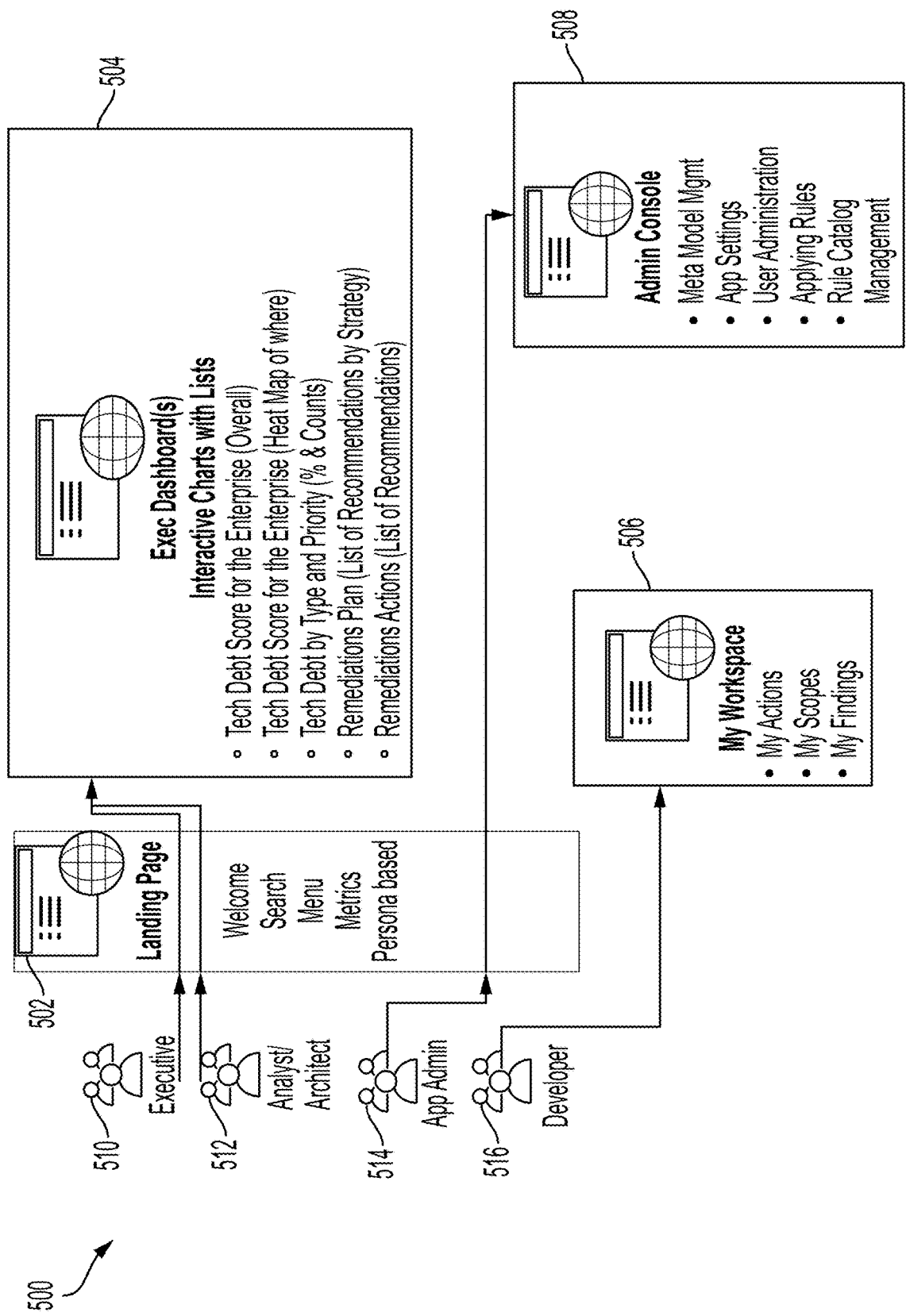
FIG. 5 is a diagram depicting an example user interface of a technical debt management machine, in accordance with an embodiment of the disclosure.

We now turn to FIG. 5.

FIG. 5 is a diagram depicting an example user interface 500 of a technical debt management machine, in accordance with an embodiment of the disclosure.

The example user interface 500 can be displayed by at least a portion of a display device. The example user interface 500 can include graphical user interfaces depicting a landing page 502, an executive dashboard 504, a workspace 506, an administrative console 508, or a combination thereof.

The landing page 502 can depict information describing capabilities of the technical debt management machine. The landing page 502 can include a search feature enabling a user to search for a feature of the technical debt management machine, an aspect of the technical debt management machine, an aspect of a rule, or a combination thereof. The landing page 502 can include a menu to enable efficient navigation through the features of the technical debt management machine. In examples, the landing page 502 can display metrics including, and not limited to, a technical debt score. In an example, the landing page 502 can be based on a persona. The landing page 502 can be configured to receive user input information describing an action to be performed by the technical debt management machine.

In nonlimiting examples, typical users of the landing page 502 can include an executive 510, an analyst/architect 512, an application administrator 514, or a combination thereof.

The executive dashboard 504 can depict information describing a technical debt score for an enterprise (e.g. a numerical score for a plurality of software platforms of a company), a technical debt score heat map indicating details of a technical debt score, a list of technical debt by type and priority, a remediation plan, a list of remediation actions, or a combination thereof.

In nonlimiting examples, typical users of the executive dashboard 504 can include an executive 510, an analyst/architect 512, or a combination thereof.

The workspace 506 can depict information describing a potential user action, a search scope, a result of a scan, or a combination thereof. The workspace 506 can be configured to receive user input information describing an action to be performed by the technical debt management machine. Example pages of the workspace 506 are depicted in FIGS. 4A-4F and 6.

In nonlimiting examples, typical users of the workspace 506 can include a developer 516.

The administrative console 508 can depict information describing meta model management, application settings, user administration, role application, rule catalogue management, or a combination thereof. The administrative console 508 can be configured to receive user input information describing an action to be performed by the technical debt management machine.

In nonlimiting examples, typical users of the administrative console 508 can include an application administrator 514.

Figure 6:
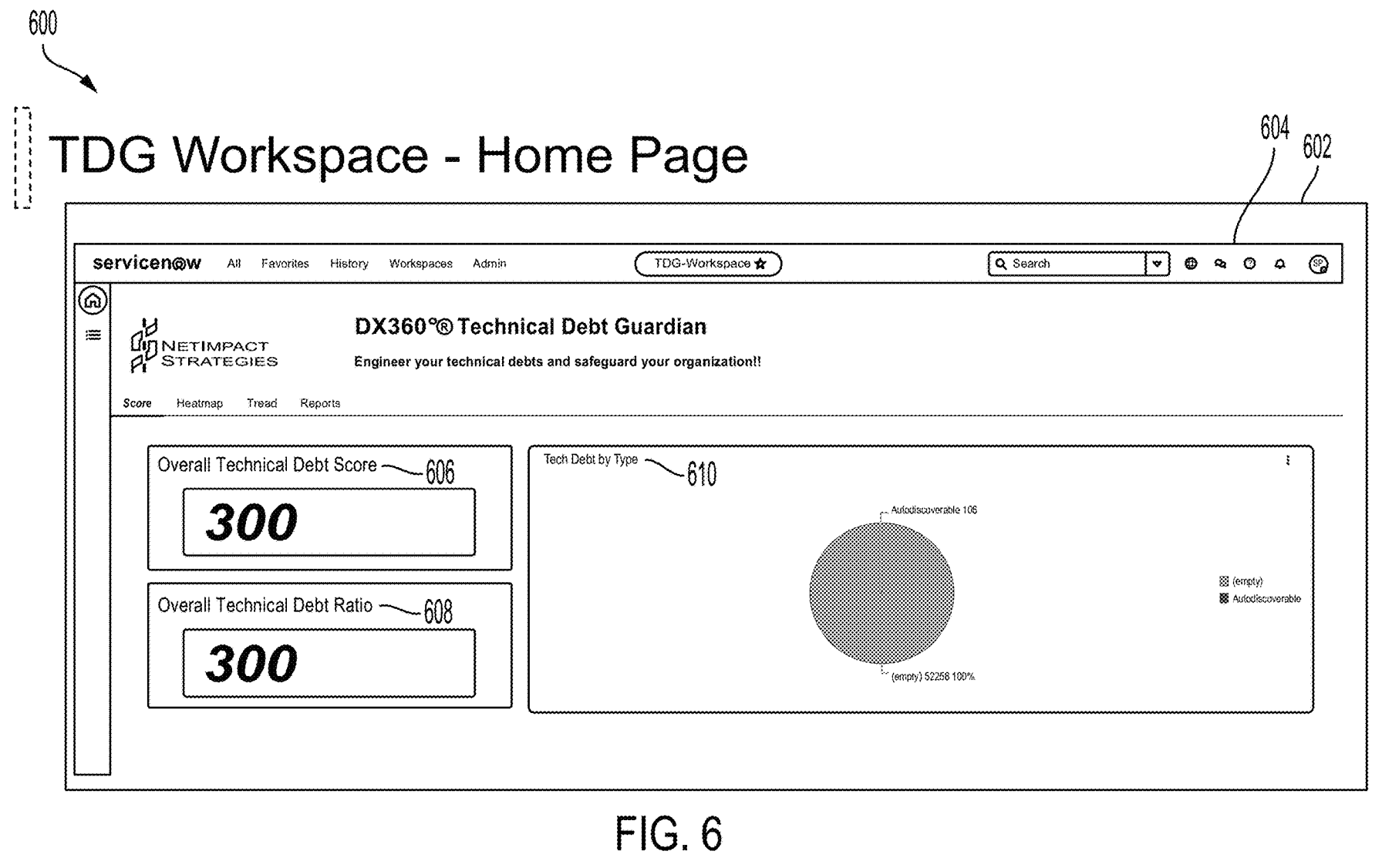

We now turn to FIG. 6.

FIG. 6 is a diagram depicting a non-limiting example user interface 600 including a user display or portion thereof 602 with a home page 604 of a graphical user interface of a technical debt management machine, in accordance with an embodiment of the disclosure.

The home page 604 can depict an overall technical debt score 606 calculated from respective technical debt scores calculated for a plurality of different previously scanned objects, applications, or both. In examples, the home page 604 can depict an overall technical debt ratio 608. In some embodiments, the homepage 604 can depict a technical debt by type. The homepage 604 can depict charts, graphs, heat maps, etc. depicting aspects of search results, calculations based on the search results, or a combination thereof.

We now turn to FIG. 7.

FIG. 7 is a diagram depicting a non-limiting example user interface 700 including a user display or portion thereof 702 with a search results page 704 of a graphical user interface of a technical debt management machine, in accordance with an embodiment of the disclosure.

The search results page 704 can depict information describing a technical debt type 706. The search results page 704 can include information, per-technical debt type, describing: a weight 708, a score 710, a number of applicable objects 712 (i.e. a number of scanned objects), a number of technical debt objects 714 (i.e. number of scanned objects in which technical debt is present), a remediation effort per object 716 (i.e. a number of estimated hours to remediate technical debt per object), a number of critical objects 718 (i.e. a number of scanned objects in which the presence of technical debt has a critical effect), a number of high objects 720 (i.e. a number of scanned objects in which the presence of technical debt has a high effect), a number of medium objects 722 (i.e. a number of scanned objects in which the presence of technical debt has a medium effect), a number of low objects 724 (i.e. a number of scanned objects in which the presence of technical debt has a low effect), an estimated debt in effort 726, a budget to remediate critical objects 728 (i.e. a budget to remediate scanned objects in which the presence of technical debt has a critical effect), a budget to remediate high objects 730 (i.e. a budget to remediate scanned objects in which the presence of technical debt has a high effect), a budget to remediate objects 732 (i.e. a budget to remediate scanned objects in which the presence of technical debt has a medium effect), a budget to remediate low objects 734 (i.e. a budget to remediate scanned objects in which the presence of technical debt has a low effect), a total budget to remediate all scanned objects in which technical debt is present 736, or a combination thereof.

Figure 8:
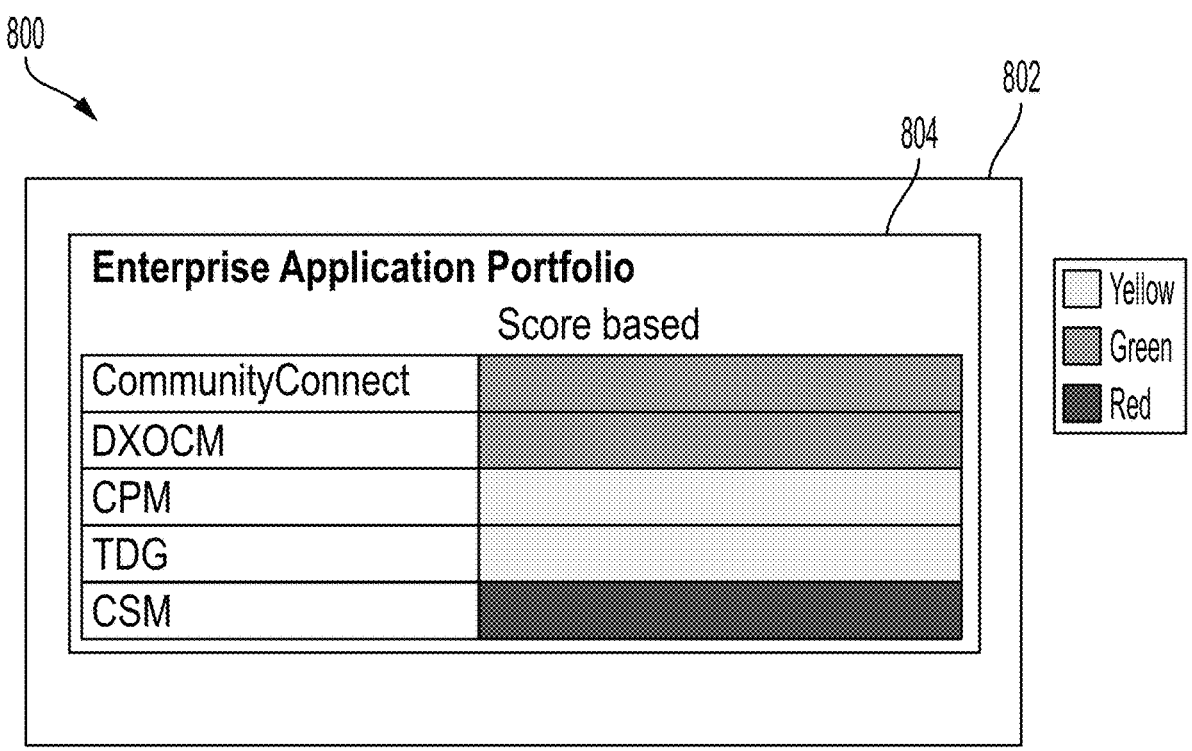
FIG. 8 is a diagram depicting an example user display or portion thereof with a search results page of a graphical user interface of a technical debt management machine, in accordance with an embodiment of the disclosure.

We now turn to FIG. 8.

FIG. 8 is a diagram depicting a non-limiting example user interface 800 including a user display or portion thereof 802 with a search results page 804 of a graphical user interface of a technical debt management machine, in accordance with an embodiment of the disclosure.

The search results page 804 can depict information describing a color-coded depiction of scores provided by at least one scanner. The search results page 804 can depict a color-coded depiction of a technical debt score for at least one application.

In an example, a score that meets or exceeds a first threshold can receive a green color-coded depiction of the score. In an example, a score that does not meet but exceeds the first threshold can receive a green color-coded depiction of the score.

In an example, a score that fails to meet or exceed a second threshold can receive a red color-coded depiction of the score. In an example, a score that does not meet the second threshold can receive a red color-coded depiction of the score.

In an example, a score that fails to meet the first threshold and meets or exceeds the second threshold can receive a yellow color-coded depiction of the score. In an example, a score that fails to meet the first threshold and exceeds the second threshold can receive a yellow color-coded depiction of the score.

In an example, a score that meets but does not exceed the first threshold and meets or exceeds the second threshold can receive a yellow color-coded depiction of the score. In an example, a score that meets but does not exceed the first threshold and exceeds the second threshold can receive a yellow color-coded depiction of the score.

We now turn to FIG. 9.

FIG. 9 is a diagram depicting a non-limiting example user interface 900 including a user display or portion thereof 902 with a search results page 904 of a graphical user interface of a technical debt management machine, in accordance with an embodiment of the disclosure.

The search results page 904 can depict information describing a distribution of rule violations by technical debt type 906. The search results page 904 can depict information, per the technical debt type 906, describing: a distribution percentage (also known as a spread 908), a number of applicable scanned objects 910, a number of scanned objects 912 in which the technical debt is detected as a result of a rule violation, a number of critical objects 914 (i.e. a number of scanned objects in which the presence of technical debt has a critical effect), a number of high objects 916 (i.e. a number of scanned objects in which the presence of technical debt has a high effect), a number of medium objects in 918 (i.e. a number of scanned objects in which the presence of technical debt has a moderate effect), a number of low objects 920 (i.e. a number of scanned objects in which the presence of technical debt has a low effect), or a combination thereof.

Figure 10:
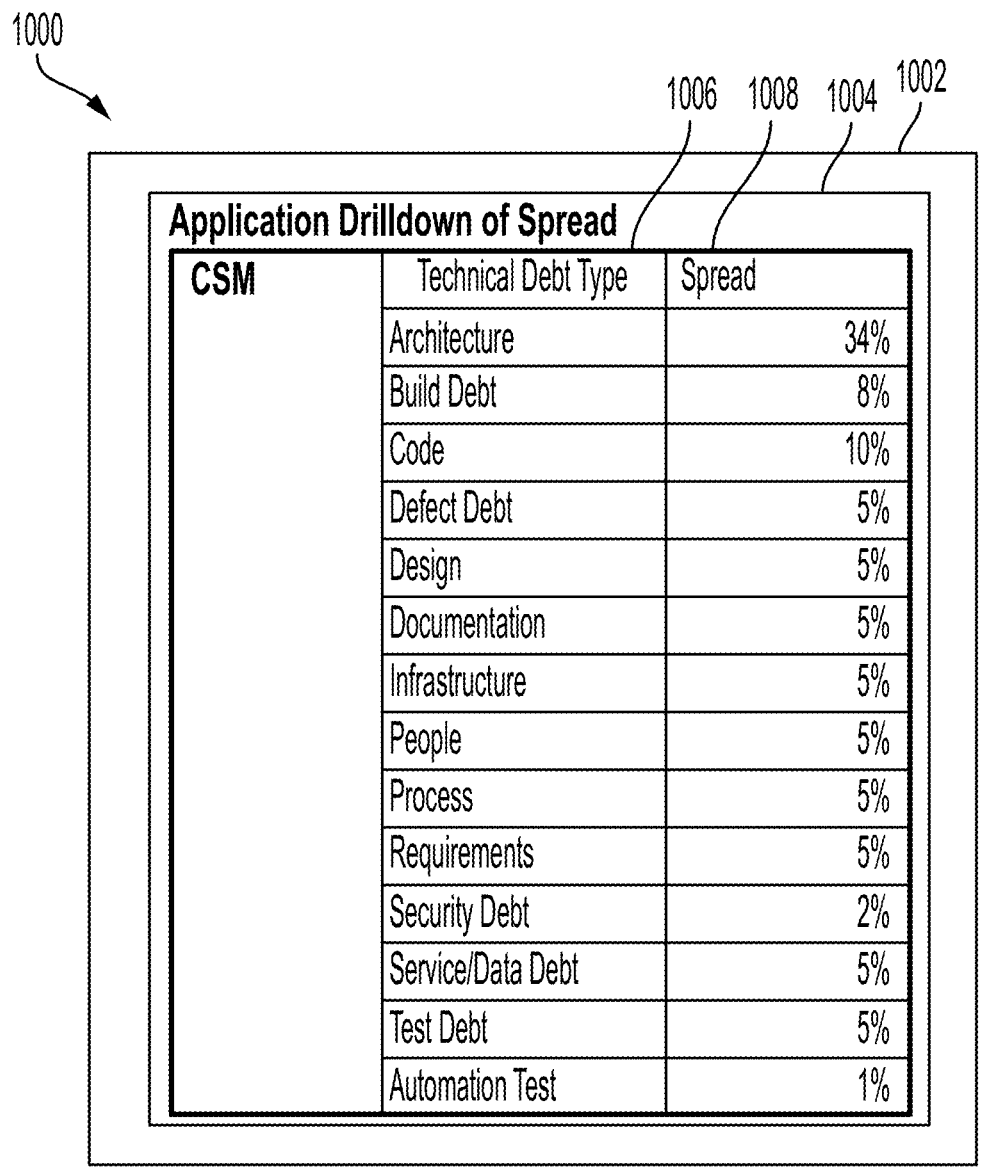
FIG. 10 is a diagram depicting an example user display or portion thereof with a search results page of a graphical user interface of a technical debt management machine, in accordance with an embodiment of the disclosure.

We now turn to FIG. 10.

FIG. 10 is a diagram depicting a non-limiting example user interface 1000 including a user display or portion thereof 1002 with a search results page 1004 of a graphical user interface of a technical debt management machine, in accordance with an embodiment of the disclosure.

The search results page 1004 can depict a reduced set of information describing a distribution of rule violations both per application and by technical debt type 1006. The search results page 1004 can depict information, per the technical debt type 1006, describing a distribution percentage (also known as a spread 1008).

Figure 11:
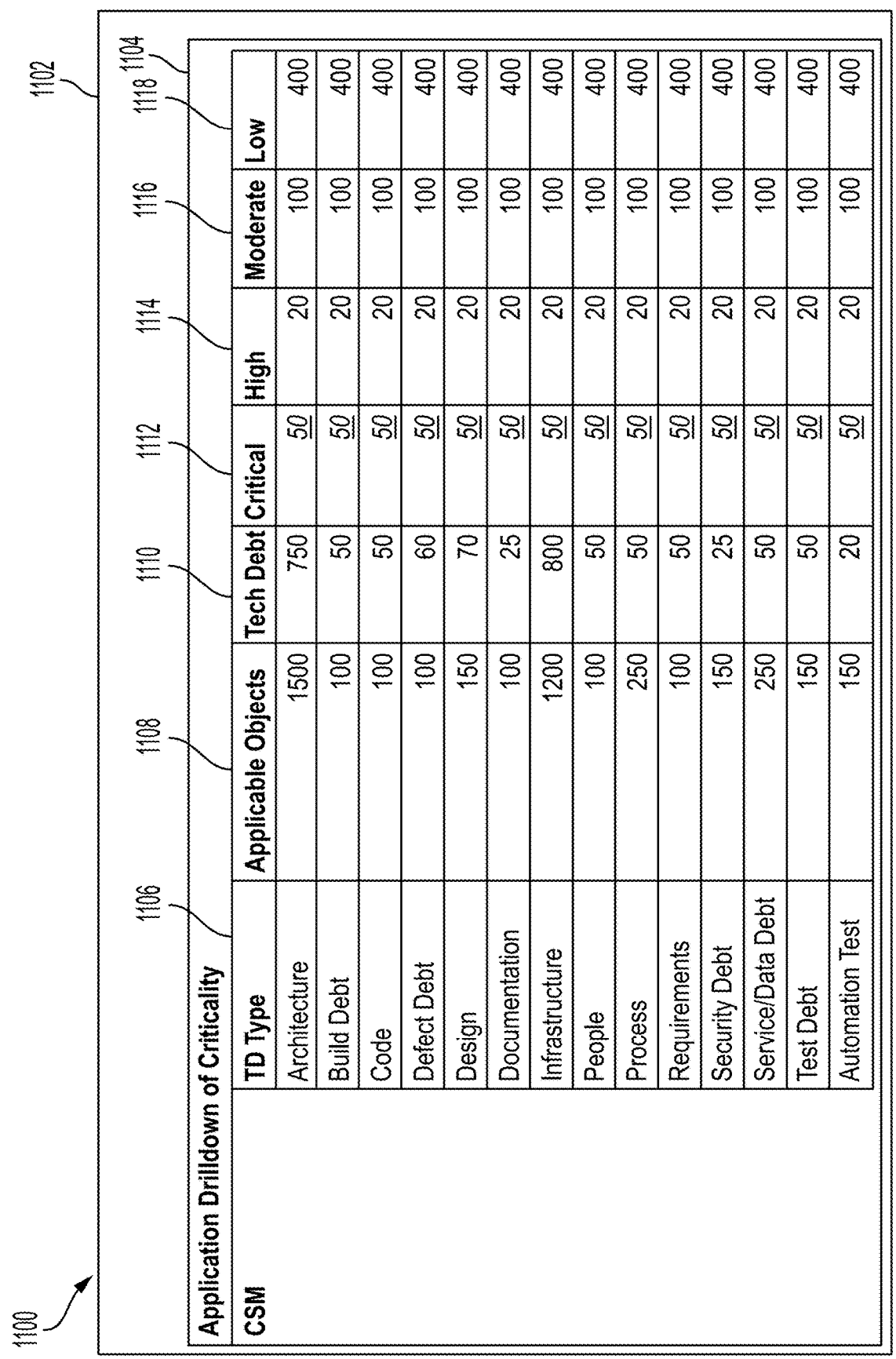
FIG. 11 is a diagram depicting an example user display or portion thereof with a search results page of a graphical user interface of a technical debt management machine, in accordance with an embodiment of the disclosure.

We now turn to FIG. 11.

FIG. 11 is a diagram depicting a non-limiting example user interface 1100 including a user display or portion thereof 1102 with a search results page 1104 of a graphical user interface of a technical debt management machine, in accordance with an embodiment of the disclosure.

The search results page 1104 can depict information describing a distribution of rule violations both per application and by technical debt type 1106. The search results page 1104 can depict information, per the technical debt type 1106, describing: a number of applicable scanned objects 1108, a number of scanned objects 1110 in which the technical debt is detected as a result of a rule violation, a number of critical objects 1112 (i.e. a number of scanned objects in which the presence of technical debt has a critical effect), a number of high objects 1114 (i.e. a number of scanned objects in which the presence of technical debt has a high effect), a number of medium objects in 1116 (i.e. a number of scanned objects in which the presence of technical debt has a moderate effect), a number of low objects 1118 (i.e. a number of scanned objects in which the presence of technical debt has a low effect), or a combination thereof.

We now turn to FIG. 12.

FIG. 12 is a diagram depicting a non-limiting example user interface 1200 including a user display or portion thereof 1202 with a search results page 1204 of a graphical user interface of a technical debt management machine, in accordance with an embodiment of the disclosure.

The search results page 1204 can depict information describing a distribution of rule violations both per application and by priority 1206, including: the priority 1206, a remediation strategy 1208, organized by the priority 1206, to remediate technical debt detected as a result of a rule violation, a number of objects 1210, per the respective remediation strategy 1208, in which the technical debt can be remediated by the respective remediation strategy 1208, an estimated number of hours 1212, based on the number of objects 1210, to remediate the technical debt by the respective remediation strategy 1208, a budget allocation, per the respective remediation strategy 1208 to remediate the technical debt by the respective remediation strategy 1208, or a combination thereof.

Figure 13:
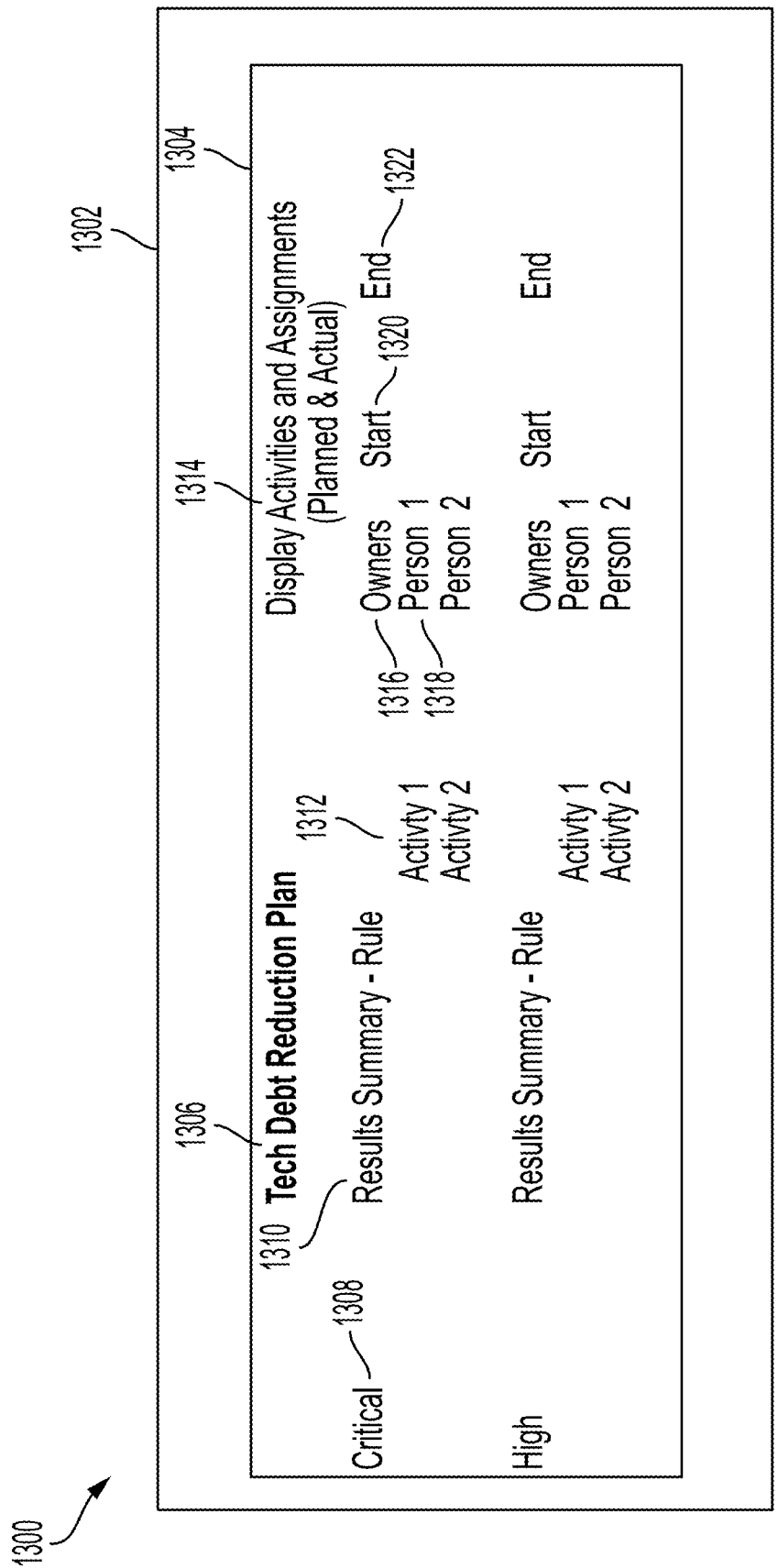
FIG. 13 is a diagram depicting an example user display or portion thereof with a search results page of a graphical user interface of a technical debt management machine, in accordance with an embodiment of the disclosure.

We now turn to FIG. 13.

FIG. 13 is a diagram depicting a non-limiting example user interface 1300 including a user display or portion thereof 1302 with a search results page 1304 of a graphical user interface of a technical debt management machine, in accordance with an embodiment of the disclosure.

The search results page 1304 can depict information describing a technical debt reduction plan 1306. In a non-limiting example, the technical debt reduction plan 1306 can include a per-level of criticality display that includes a level of criticality 1308 and a per-rule results summary 1310. The per-rule results summary 1310 can include a list of technical debt remediation activities 1312 to be performed to mitigate the technical debt identified by the respective rule.

The technical debt reduction plan 1306 can include activities and assignments 1314. The activities and assignments 1314 can include information describing an owner 1316 (i.e. a person 1318 responsible for performing at least a portion of one of the respective technical debt remediation activities 1312). The activities and assignments 1314 can also include a start date 1316, an end date 1318, or a combination thereof of the at least the portion of the one of the respective technical debt remediation activities 1312.

Figure 14:
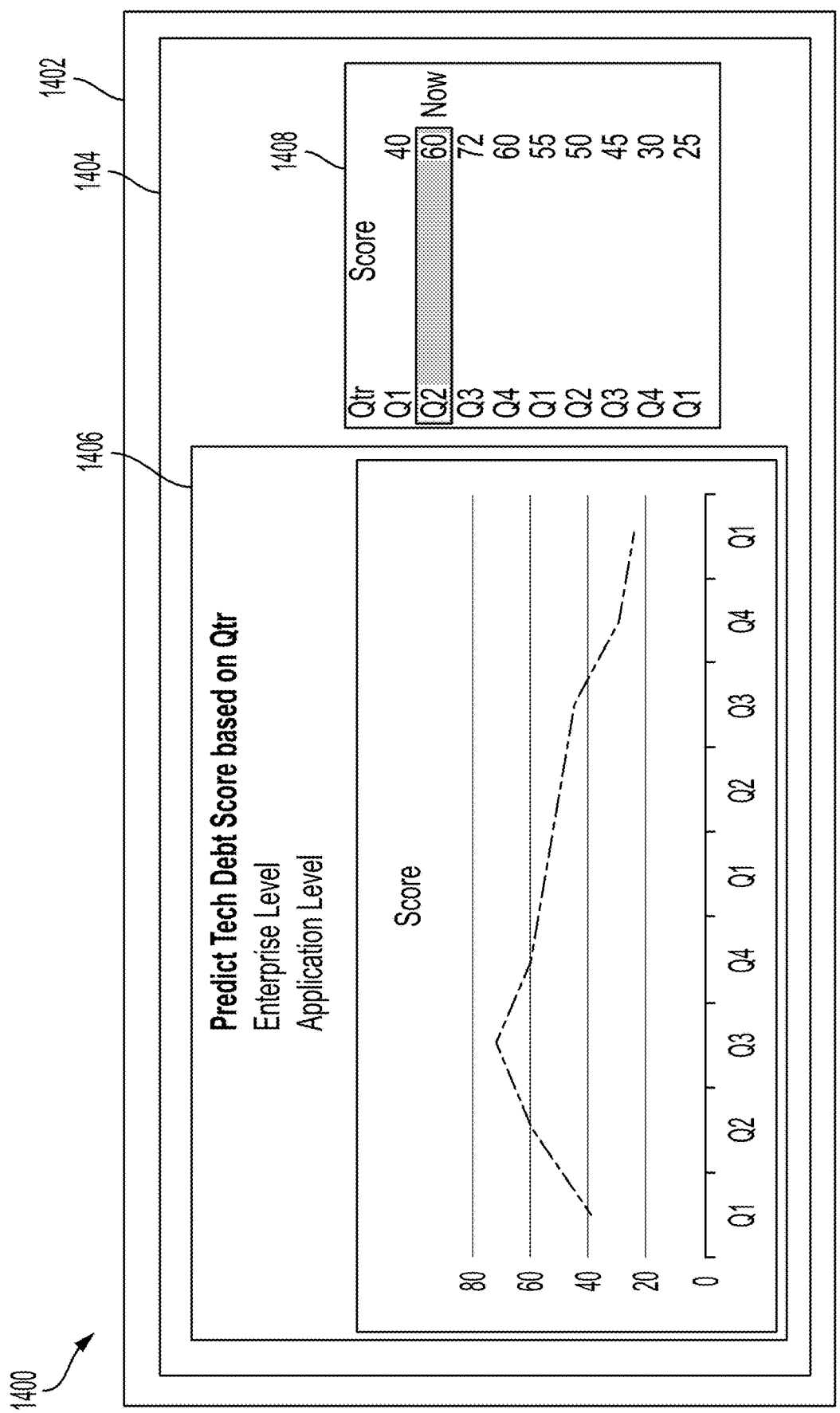
FIG. 14 is a diagram depicting an example user display or portion thereof with a search results page of a graphical user interface of a technical debt management machine, in accordance with an embodiment of the disclosure.

We now turn to FIG. 14.

FIG. 14 is a diagram depicting a non-limiting example user interface 1400 including a user display or portion thereof 1402 with a search results page 1404 of a graphical user interface of a technical debt management machine, in accordance with an embodiment of the disclosure.

The search results page 1404 can depict information describing an estimated technical debt score in a form of a graph 1406. In some examples, the search results page 1404 can depict information describing the estimated technical debt score in a form of a chart 1408. The estimated technical debt score can be calculated (e.g. projected) using a present technical debt score, a quantity of rule violations, an estimated per-violation time to perform remediation activities, an estimated per-violated rule to perform remediation activities, an estimated per-violation rate of remediation activities, an estimated per-violated rule to perform remediation activities, or a combination thereof.

The graph 1406 can depict the estimated technical debt score over time. The graph 1406 can depict the estimated technical debt score on a daily basis, a weekly basis, a monthly basis, a quarterly basis, a half-year basis, a yearly basis, or a combination thereof. The graph 1406 can depict the estimated technical debt score on a linear scale, a logarithmic scale, or both. In examples, the graph 1406 can also estimate previous technical debt scores (e.g. calculated, previously estimated, or both).

The chart 1408 can depict the estimated technical debt score over time. The chart 1408 can depict the estimated technical debt score on a daily basis, a weekly basis, a monthly basis, a quarterly basis, a half-year basis, a yearly basis, or a combination thereof. In examples, the chart 1408 can also estimate previous technical debt scores (e.g. calculated, previously estimated, or both).

Figure 15A:
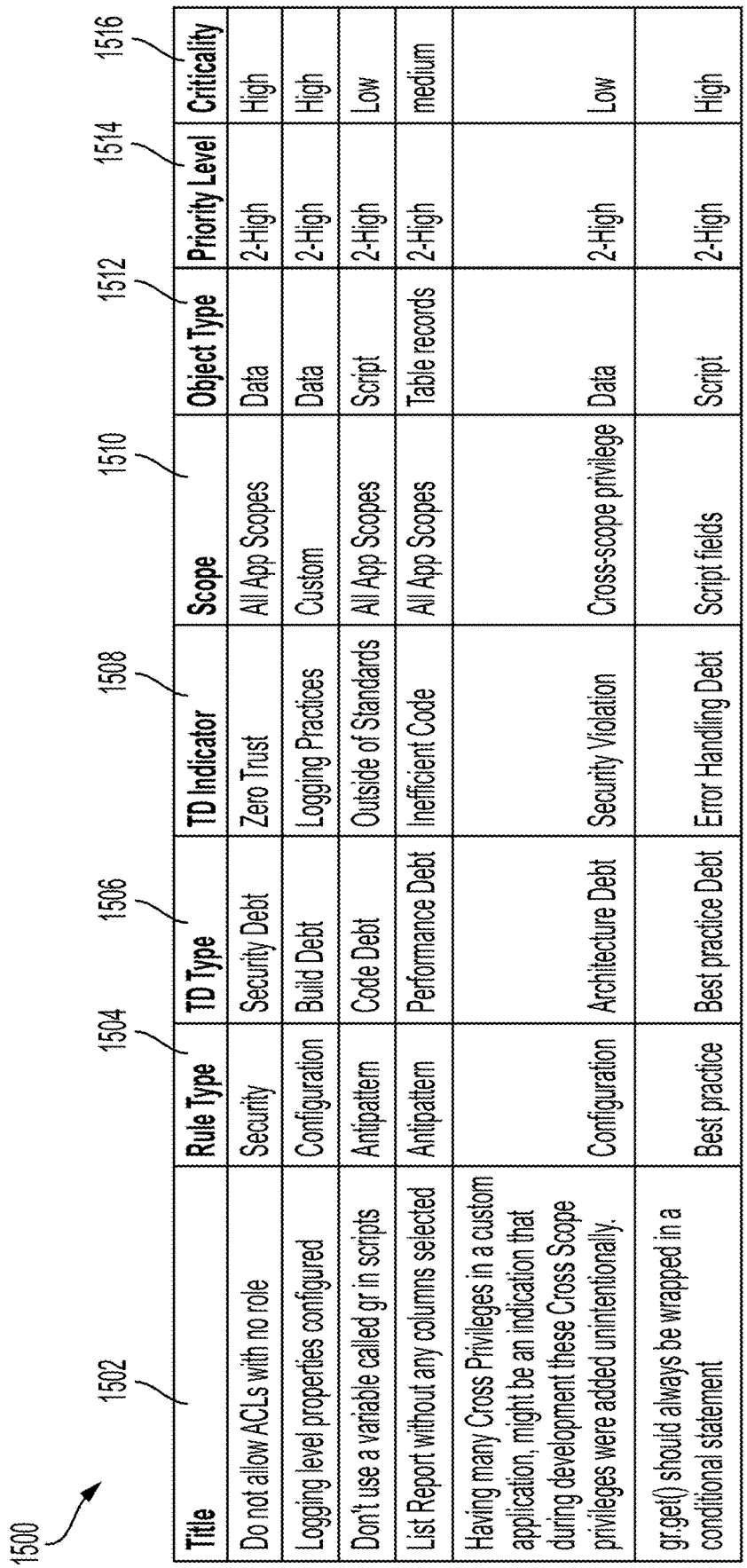

We now turn to FIGS. 15A-15C.

FIGS. 15A-15C are diagrams depicting non-limiting example rule information 1500 of a technical debt management machine, in accordance with an embodiment of the disclosure. The example rule information 1500 can describe information that can be used to identify a presence of technical debt. The example rule information 1500 depicted in FIGS. 15A-15C are not limiting. In examples, the example rule information 1500 can be a constituent part of a technical debt management machine. The example rule information 1500 can be based on a technical debt type. The provided systems and methods advantageously provide techniques for adapting and changing rules and rule information based upon changes in aspects of technical debt.

The example rule information 1500 can be configured as a set of computer-executable instructions (e.g. software instructions), where the computer-executable instructions can be stored by a non-transitory computer-readable data storage device, a non-transitory computer-readable medium, or both.

In examples, the process management machine can include at least a portion of the example rule information 1500 configured as a set of computer-executable instructions (e.g. software instructions), where the computer-executable instructions can be stored on a non-transitory computer-readable data storage device, a non-transitory computer-readable medium, or both.

In examples, the example rule information 1500 can include information describing at least one information characteristic of: an instruction stored on a tangible processor-readable medium and configured to cause a processor to execute the instruction, an output of the processor following execution of the instruction, or a combination thereof.

In examples, the example rule information 1500 can include information describing, per-rule, at least one of: a rule title 1502, a rule type 1504, a technical debt type 1506, a technical debt indicator 1508, a rule scope 1510, an object type 1512, a priority level 1514, a criticality 1516 (e.g., low, medium, high), a description 1518, a discovery approach 1520, a resolution approach 1522, a source 1524, a technical debt map 1526, an active indication 1528, at least one information characteristic whose presence in an object being scanned indicates technical debt and results in a violation of the rule, an amount that a technical debt score must be changed for a violation of the rule, a weight to be afforded to a violation of the rule, a script to be used during a search for an identifiable characteristic of technical debt, or a combination thereof.

In embodiments, the example rule information 1500 can include information describing, per rule, at least one of: at least one object which the rule can be compared, a respective remediation effort to cure the violation of the rule, a text description of the rule, a priority level of the rule, a keyword to be searched for during the comparing, an object type to which the rule applies, a candidate resolution approach to remediate a violation of the rule, a rule violation discovery approach, an application tag of the rule, an activation status of the rule, an inactivation status of the rule, a source of the rule, if the rule is configured to automatically execute during the comparing, or a combination thereof.

In examples, the technical debt type 1506 can include, and is not limited to, architecture debt, code debt, data debt, defect debt, design debt, documentation debt, governance debt, infrastructure debt, operations and maintenance debt, people debt, privacy protection debt, process debt, requirements debt, security debt, service debt, test automation debt, test debt, user experience debt, or a combination thereof.

In examples, the technical debt type 1506 can include, is not limited to, legacy code, hardcoded values, outdated libraries, outdated dependencies, inconsistent coding techniques, or a combination thereof.

The example rule information 1500 can include information describing, per rule, at least one information characteristic whose presence in an object being scanned indicates technical debt and results in a violation of the rule.

In an example, the information characteristic can include, and is not limited to: an outdated syntax, an outdated update, an outdated library, infrequently accessed portions of code, infrequently updated portions of code information from a deprecated library, infrequent code refactoring, an outdated test completion date, a cache invalidation error, an off-by-one error, frequent code errors, a reference to a specific value, an absence of a variable, an outdated dependency, an outdated library, a security breach, a code crash, and lack of documentation, lack of efficiency, a lack of query efficiency, a substandard privacy control, a non-standard data storage format, a lack of interoperability, a noncompliance with a regulatory standard, fragmented code, a monolithic architecture, a reliance on an obsolete application programming interface, a lack of integration with a related system, a broken link, a user interface defect, or a combination thereof.

In an example, the information characteristic can include, and is not limited to: an incompatibility between software, an unpatched vulnerability, a process bottleneck, a scaling problem, an inconsistent coding style, a static code analyzer error, an unexpected error arising in one module due to a change in a different module, a growing backlog of unresolved errors, a frequency of software patches, duplicate code, four code performance, decreasing code performance, features that do not address a user need, an artificial intelligence hallucination, computer-executable instructions known to generate an artificial intelligence hallucination, or a combination thereof.

In some examples, the rule information can be based on an information characteristic described by a published best practice, information characteristic described by an open source of information, an information characteristic resulting from a detrimental practice, an information characteristic resulting from user experience, or a combination thereof.

Exemplary embodiments discussed herein can provide certain advantages. These advantages can include those provided by the disclosed features.

Although systems and methods for generating a process management machine are described hereby in a language specific to structural features and/or methods, the appended claims are not necessarily limited to the specific features or methods described. Rather, the specific features and methods are disclosed as examples of implementations for generating a process management machine.

One or more embodiments of the disclosed subject matter are described herein with specificity to meet statutory requirements, but this description does not limit the scope of the claims. The claimed subject matter can be embodied in other ways, can include different elements or steps, and can be used in conjunction with other existing or later developed technologies. This description should not be interpreted as implying any required order or arrangement among or between various steps or elements except when the order of individual steps or arrangement of elements is explicitly noted as being required.

Embodiments of the disclosure are described more fully herein with reference to the accompanying drawings, which form a part hereof, and which show, by way of illustration, exemplary embodiments by which the disclosure can be practiced. The disclosure may, however, be embodied in different forms and should not be construed as limited to the embodiments set forth herein, rather, these embodiments are provided so that this disclosure will satisfy the statutory requirements and convey the scope of the disclosure to those skilled in the art.

Among others, the subject matter of the disclosure can be embodied in whole or in part as a system, as one or more methods, or as one or more devices. Embodiments can take the form of a hardware implemented embodiment, a software implemented embodiment, or an embodiment combining software and hardware aspects. For example, in some embodiments, one or more of the operations, functions, processes, or methods disclosed and/or described herein can be implemented by one or more suitable processing elements (such as a processor, co-processor, microprocessor, Central Processing Unit, Graphics Processing Unit, Tensor Processing Unit, Quantum Processing Unit, controller, or a combination thereof, as non-limiting examples) that is part of a client device, server, network element, remote platform (such as a Software as a Service (SaaS) platform), an "in the cloud" service, or other form of computing or data processing system, device, or platform.

The processing element or elements can be programmed with a set of executable instructions (e.g. software instructions), where the instructions can be stored on (or in) one or more suitable non-transitory computer-readable data storage elements, one or more suitable non-transitory computer-readable media, or both. In an embodiment, the set of instructions can be conveyed to a user through a transfer of instructions or an application that executes a set of instructions (such as over a network, e.g., the Internet). In an embodiment, a set of instructions or an application can be utilized by an end-user through access to a SaaS platform or a service provided through such a platform.

In an embodiment, the systems and methods disclosed herein can provide services through a SaaS or multi-tenant platform. The platform provides access to multiple entities, each with a separate account and associated data storage. Each account can correspond to a User, set of Users, an entity, a set or category of entities, a company, a business advisor, a set or category of Users, an industry, an organization, or a combination thereof, as examples. Each account can access one or more services, a set of which are instantiated in their account, and which implement at least a portion of one or more of the methods, features, or functions disclosed herein.

In an embodiment, one or more of the operations, functions, processes, features, or methods disclosed herein can be implemented by a specialized form of hardware, such as a programmable gate array, application specific integrated circuit (ASIC), or the like. An embodiment of the disclosure can be implemented in the form of an application, a subroutine that is part of a larger application, a "plug-in," an extension to the functionality of a data processing system or platform, or other suitable form. This description is, therefore, not to be taken in a limiting sense.

It should be understood that the present invention as described herein can be implemented in a form of control logic using computer software in a modular or integrated manner. Based on the disclosure and teachings provided herein, a person of ordinary skill in the art will know and appreciate other techniques to implement an embodiment of the disclosure using hardware or a combination of hardware and software.

Any of the software components, processes or functions described in this application can be implemented as software code to be executed by a processor using any suitable computer language such as at least one of Python, Java, JavaScript, C, C++, C# ("C Sharp"), Type Script, Java Script, Platform Client Application Programming Interface (API) Script, or Perl using procedural, functional, object-oriented, or other techniques. The software code can be stored as a series of instructions, or commands in (or on) a non-transitory computer-readable medium, such as a random-access memory (RAM), a read only memory (ROM), a magnetic medium such as a hard-drive, a jump drive, an optical medium such as a CD-ROM, or a combination thereof. In this context, a non-transitory computer-readable medium is almost any medium suitable for the storage of data or an instruction set aside from a transitory waveform. Any such computer readable medium can reside on or within a single computational apparatus and can be present on or within different computational apparatuses within a system or network.

According to one example implementation, the term processing element or processor, as used herein, can be a central processing unit (CPU), or conceptualized as a CPU (such as a virtual machine). In this example implementation, the CPU or a device in which the CPU is incorporated can be at least one of coupled, connected, or in communication with one or more peripheral devices, such as the user display device. In another example implementation, the processing element or processor can be incorporated into a mobile computing device, such as a smartphone or tablet computer.

The non-transitory computer-readable storage medium referred to herein can include a number of physical drive units, such as a redundant array of independent disks (RAID), a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium can include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. In some embodiments, one or more of the blocks, or stages or steps may not necessarily need to be performed in the order presented or may not necessarily need to be performed.

The computer-executable program instructions described herein can be loaded onto a special purpose computer, a processor, or other programmable data processing apparatus to produce a specific example of a machine, such that the instructions executed by the computer, processor, or other programmable data processing apparatus create means for implementing one or more of the functions, operations, processes, or methods described herein. These computer program instructions can also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims when they have structural elements, functional elements, or both that do not differ from the literal language of the claims, or if they include structural elements, functional elements, or both with insubstantial differences from the literal language of the claims.

The use of the terms "a," "an," "the," and similar referents in the specification and in the following claims are to be construed to cover both the singular and the plural, unless otherwise indicated herein or clearly contradicted by context. The singular portends the plural, where practicable. The terms "having," "including," "containing," and similar referents in the specification and in the claims are to be construed as open-ended terms (e.g. meaning "including, but not limited to,") unless otherwise noted. All methods described herein can be performed in any suitable order unless otherwise indicated herein or clearly contradicted by context. The use of all examples, or exemplary language (e.g. "such as") provided herein, is intended merely to better illuminate embodiments of the disclosure and do not pose a limitation to the scope of the invention unless otherwise claimed. No language in the specification should be construed as indicating any non-claimed element as essential to each embodiment of the present invention.

The words "receiving," "generating," "extracting," "determining," "calculating," and other forms thereof are intended to be open ended in that an item or items following any one of these words is not meant to be an exhaustive listing of such item or items or meant to be limited to only the listed item or items. The term "or" is used inclusively to refer to items in the alternative and in combination.

Different arrangements of the components depicted in the drawings or described above, as well as components and steps not shown or described are possible. Similarly, some features and sub-combinations are useful and can be employed without reference to other features and sub-combinations. Embodiments of the invention have been described for illustrative and not restrictive purposes, and alternative embodiments will become apparent to readers of this patent. Accordingly, the present invention is not limited to the embodiments described herein or depicted in the drawings, and various embodiments and modifications can be made without departing from the scope of the claims. The disclosed embodiments are merely exemplary of the disclosure, which can be embodied in various forms.

What is claimed is:

1. A computer-implemented method for automatically generating at least a portion of a technical debt management machine, the method being performed by a computing device comprising at least one processor, the method comprising:
    comparing, by the at least one processor and by automatically searching using a rule engine, information in at least a portion of an object in a software platform to a rule to identify a violation of the rule,
    wherein:
        the rule describes at least one information characteristic whose presence in an object being scanned indicates technical debt and results in the violation of the rule; and
        the rule describes an amount that a technical debt score must be changed for the violation of the rule;
    changing, responsive to the violation of the rule, the technical debt score by the amount the technical debt score must be changed for the violation of the rule; and
    displaying, by a user display device and via a user interface, the technical debt score.

2. The computer-implemented method of claim 1, wherein the comparing further comprises searching the at least the portion of the object in the software platform for the at least one information characteristic described by the rule and resulting from a specific type of technical debt.

3. The computer-implemented method of claim 2, wherein the type of technical debt is at least one of:
    architecture debt;
    code debt;
    data debt;
    defect debt;
    design debt;
    documentation debt;

governance debt;
infrastructure debt;
operations and maintenance debt;
people debt;
privacy protection debt;
process debt;
requirements debt;
security debt;
service debt;
test automation debt;
test debt; or
user experience debt.

4. The computer-implemented method of claim 1, wherein the comparison further includes the rule initiating artificial intelligence searching of the object to identify the violation of the rule, wherein the artificial intelligence searching of the object comprises performing a neural network convolution on information from the object being scanned.

5. The computer-implemented method of claim 1, wherein the at least one information characteristic describes an artificial intelligence hallucination.

6. The computer-implemented method of claim 1, wherein the comparing is performed per object type.

7. The computer-implemented method of claim 1, wherein:
the rule further includes information describing a weight to be afforded to the violation of the rule; and
the weight is per-technical debt type.

8. The computer-implemented method of claim 1, wherein the rule includes information describing at least one of:
a rule title;
a rule type;
at least one object which the rule can be compared;
a respective remediation effort to cure the violation of the rule;
a text description of the rule;
a priority level of the rule;
a keyword to be searched for during the comparing;
an object type to which the rule applies;
a candidate resolution approach to remediate a violation of the rule;
a rule violation discovery approach;
a scope of the rule;
an application tag of the rule;
an activation status of the rule;
an inactivation status of the rule;
a criticality of the rule;
a source of the rule; or
if the rule is configured to automatically execute during the comparing.

9. The computer-implemented method of claim 8, further comprising displaying, by the user display device, the information describing the at least one of:
the rule title;
the rule type;
the at least one object which the rule can be compared;
the respective remediation effort to cure the violation of the rule;
the text description of the rule;
the priority level of the rule;
the amount that the technical debt score must be changed for the violation of the rule;
the technical debt score value change associated with the violation of the rule;
the keyword to be searched for during the comparing;
the object type to which the rule applies;
the candidate resolution approach to remediate the violation of the rule;
the rule violation discovery approach;
the scope of the rule;
the application tag of the rule;
the activation status of the rule;
the inactivation status of the rule;
the criticality of the rule;
the source of the rule; or
if the rule is configured to automatically execute during the comparing.

10. The computer-implemented method of claim 1, further comprising:
receiving, from a user input device, information describing a characteristic of the rule; and
storing, in a processor-readable storage device, the information describing the characteristic of the rule.

11. The computer-implemented method of claim 10, wherein the characteristic of the rule describes a type of technical debt, wherein the type of technical debt is based on at least one of a system context or a technology context.

12. The computer-implemented method of claim 1, further comprising storing, in a processor-readable storage device and in a catalog of rules, information describing the rule.

13. The computer-implemented method of claim 1, further comprising displaying, by the user display device, information describing a characteristic of the rule.

14. The computer-implemented method of claim 1, further comprising displaying, by the user display device and via a heat map, respective technical debt scores per at least one of:
application;
type of technical debt; or
remediation strategy.

15. The computer-implemented method of claim 1, further comprising:
scaling the technical debt score to fit in a predetermined range; and
displaying, by the user display device and via the user interface, the converted technical debt score, wherein the converted technical debt score is:
for an application or
a combined technical debt score for a defined plurality of applications.

16. The computer-implemented method of claim 1, further comprising:
calculating a trend of the technical debt score over time; and
displaying, by the user display device and via the user interface, the trend of the technical debt score over time.

17. The computer-implemented method of claim 1, further comprising:
categorizing respective technical debt scores per type of technical debt and priority; and
displaying, by the user display device, the respective technical debt scores per type and priority.

18. The computer-implemented method of claim 1, further comprising:
calculating a per-object list of rule violations that contribute to the technical debt score; and
displaying, by the user display device, the per-object list of rule violations that contribute to the technical debt score.

19. The computer-implemented method of claim 1, further comprising:
    calculating, by respective technical debt type, a number of objects that violate any rule relating to the respective technical debt type; and
    displaying, by the user display device and per the respective technical debt type, the number of objects violating any rule relating to the respective technical debt type.

20. The computer-implemented method of claim 1, wherein the rule includes information describing at least one of:
    a respective remedial action;
    a per-object time estimate to resolve the rule violation;
    an estimated number of hours to resolve the rule violation;
    an estimated financial budget to resolve the rule violation;
    a name of person to assign to resolve the rule violation; or
    a name of a group of people to assign to resolve the rule violation.

21. The computer-implemented method of claim 20, further comprising displaying, by the user display device, the information describing the at least one of:
    the respective remedial action;
    the per-object time estimate to resolve the rule violation;
    the estimated number of hours to resolve the rule violation;
    the estimated financial budget to resolve the rule violation;
    the name of person to assign to resolve the rule violation; or
    the name of the group of people to assign to resolve the rule violation.

\* \* \* \* \*